US012751348B2

(12) United States Patent
Murata

(10) Patent No.: US 12,751,348 B2
(45) Date of Patent: Oct. 6, 2026

(54) WORK VEHICLE, CONTROL METHOD, AND CONTROL SYSTEM

(71) Applicant: Kubota Corporation, Osaka (JP)

(72) Inventor: Yusuke Murata, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 21 days.

(21) Appl. No.: 18/988,993

(22) Filed: Dec. 20, 2024

(65) Prior Publication Data

US 2025/0120330 A1 Apr. 17, 2025

Related U.S. Application Data

(63) Continuation of application No. PCT/JP2023/019973, filed on May 29, 2023.

(30) Foreign Application Priority Data

Jun. 29, 2022 (JP) ................................ 2022-104117

(51) Int. Cl.
*A01B 69/00* (2006.01)
*A01B 69/04* (2006.01)

(52) U.S. Cl.
CPC .................................. *A01B 69/008* (2013.01)

(58) Field of Classification Search
CPC .... A01B 69/008; A01B 69/001; G05D 1/242; G05D 1/243; G05D 2101/20; G05D 2105/15; G05D 2107/21; G05D 2109/10; G05D 2111/10; G05D 2111/17; G05D 1/622; G05D 1/672; A01D 75/185
See application file for complete search history.

(56) References Cited

U.S. PATENT DOCUMENTS

| | | | |
|---|---|---|---|
| 2019/0163190 A1 | 5/2019 | Ono | |
| 2020/0029490 A1 | 1/2020 | Bertucci et al. | |
| 2021/0357664 A1 | 11/2021 | Kocer et al. | |
| 2023/0104274 A1 | 4/2023 | Umemoto et al. | |
| 2023/0389458 A1 * | 12/2023 | Ekhe | G05D 1/0274 |

FOREIGN PATENT DOCUMENTS

| | | |
|---|---|---|
| JP | 2021029218 A | 3/2021 |
| WO | 2022038860 A1 | 2/2022 |

* cited by examiner

*Primary Examiner* — Michael V Kerrigan
(74) *Attorney, Agent, or Firm* — Keating & Bennett, LLP

(57) ABSTRACT

A work vehicle includes a sensor to sense an area of the work vehicle and output sensor data, a controller to control self-driving of the work vehicle based on the sensor data, and a link to attach an implement to the work vehicle. When the work vehicle performs the self-driving with the implement linked to the work vehicle, the controller is configured or programmed to detect and classify an object based on the sensor data, determine a first influence degree indicating a magnitude of influence when the object contacts the work vehicle and a second influence degree indicating a magnitude of influence when the object contacts the implement in accordance with a result of the classification of the object, and execute in accordance with at least one of the first and second influence degrees at least one of avoiding contact with the object or continuing the self-driving without executing avoiding.

11 Claims, 17 Drawing Sheets

*FIG. 15*

| DETECTED OBJECT | FIRST INFLUENCE DEGREE (WORK VEHICLE) | SECOND INFLUENCE DEGREE (IMPLEMENT) |
|---|---|---|
| WEEDS, BRANCHES AND LEAVES | SMALL | MEDIUM |
| PLASTIC BAG, PLASTIC GARBAGE | SMALL | MEDIUM |
| PUDDLE, HOLLOW, HOLE, STONE (SIZE: SMALL) | MEDIUM | LARGE |
| PUDDLE, HOLLOW, HOLE, STONE (SIZE: LARGE) | LARGE | LARGE |
| SNOW, GRAVEL | SMALL | SMALL |
| ANIMAL, HUMAN | LARGE | LARGE |

WORK VEHICLE, CONTROL METHOD, AND CONTROL SYSTEM

CROSS REFERENCE TO RELATED APPLICATIONS

This application claims the benefit of priority to Japanese Patent Application No. 2022-104117 filed on Jun. 29, 2022 and is a Continuation Application of PCT Application No. PCT/JP2023/019973 filed on May 29, 2023. The entire contents of each application are hereby incorporated herein by reference.

BACKGROUND OF THE INVENTION

1. Field of the Invention

The present disclosure relates to work vehicles performing self-driving, control methods for work vehicles performing self-driving, and control systems for work vehicles performing self-driving.

2. Description of the Related Art

Research and development have been directed to the automation of agricultural machines. For example, work vehicles, such as tractors, combines, and rice transplanters, which automatically travel within fields by utilizing a positioning system, e.g., a GNSS (Global Navigation Satellite System), are coming into practical use. Research and development are also under way for work vehicles which automatically travel not only within fields, but also outside the fields. Japanese Laid-Open Patent Publication No. 2021-029218 discloses a system to cause an unmanned work vehicle to automatically travel between two fields separated from each other with a road being sandwiched therebetween. International Publication No. WO2022-038860 discloses a work vehicle controlled regarding self-driving based on the state of a road where the work vehicle travels and the state of an implement linked to the work vehicle.

SUMMARY OF THE INVENTION

It is required to efficiently control a work vehicle (including an agricultural machine) to travel by self-driving.

Example embodiments of the present disclosure provide work vehicles each capable of traveling by self-driving efficiently, methods for controlling work vehicles performing self-driving to travel efficiently, and control systems capable of controlling work vehicles to travel by self-driving efficiently.

A work vehicle according to an example embodiment of the present disclosure is a work vehicle to perform self-driving. The work vehicle includes at least one sensor to sense a surrounding environment of the work vehicle and outputting sensor data, a controller configured or programmed to control the self-driving of the work vehicle based on the sensor data, and a link to attach an implement to the work vehicle. When performing the self-driving of the work vehicle in a state where the implement is linked to the work vehicle, the controller is configured or programmed to detect and classify an object based on the sensor data, determine a first influence degree indicating a magnitude of influence when the object contacts the work vehicle and a second influence degree indicating a magnitude of influence when the object contacts the implement, in accordance with a result of the classification of the object, and execute, in accordance with at least one of the first influence degree or the second influence degree, at least one of an operation of avoiding contact with the object or an operation of continuing the self-driving without executing the operation of avoiding.

A control method according to an example embodiment of the present disclosure is a control method for a work vehicle performing self-driving. The control method includes detecting and classifying an object based on sensor data output from at least one sensor included in the work vehicle, determining a first influence degree indicating a magnitude of influence when the object contacts the work vehicle and a second influence degree indicating a magnitude of influence when the object contacts the implement linked to the work vehicle, in accordance with a result of the classification of the object, and executing, in accordance with at least one of the first influence degree or the second influence degree, at least one of an operation of avoiding contact with the object or an operation of continuing the self-driving without executing the operation of avoiding.

A control system according to an example embodiment of the present disclosure is a control system for a work vehicle to perform self-driving. The control system includes at least one sensor to sense a surrounding environment of the work vehicle and output sensor data, and a controller configured or programmed to control the self-driving of the work vehicle based on the sensor data. When the work vehicle is performing the self-driving in a state where the implement is linked thereto, the controller is configured or programmed to detect and classify an object based on the sensor data, determine a first influence degree indicating a magnitude of influence when the object contacts the work vehicle and a second influence degree indicating a magnitude of influence when the object contacts the implement, in accordance with a result of the classification of the object, and execute, in accordance with at least one of the first influence degree or the second influence degree, at least one of an operation of avoiding contact with the object or an operation of continuing the self-driving without executing the operation of avoiding.

Example embodiments of the present disclosure may be implemented using devices, systems, methods, integrated circuits, computer programs, non-transitory computer-readable storage media, or any combination thereof. The computer-readable storage media may be inclusive of volatile storage media or non-volatile storage media. The devices may each include a plurality of devices. In the case where one of the devices includes two or more devices, the two or more devices may be provided within a single apparatus, or divided over two or more separate apparatuses.

Example embodiments of the present disclosure provide work vehicles each capable of traveling by self-driving efficiently, methods for controlling work vehicles to perform self-driving to travel efficiently, and control systems capable of controlling work vehicles to travel by self-driving efficiently.

The above and other elements, features, steps, characteristics and advantages of the present invention will become more apparent from the following detailed description of the example embodiments with reference to the attached drawings.

BRIEF DESCRIPTION OF THE DRAWINGS

FIG. 15 shows an example of table including a first influence degree and a second influence degree for each of object types, the table being stored in a storage.

DETAILED DESCRIPTION OF THE EXAMPLE EMBODIMENTS

Figure 1:
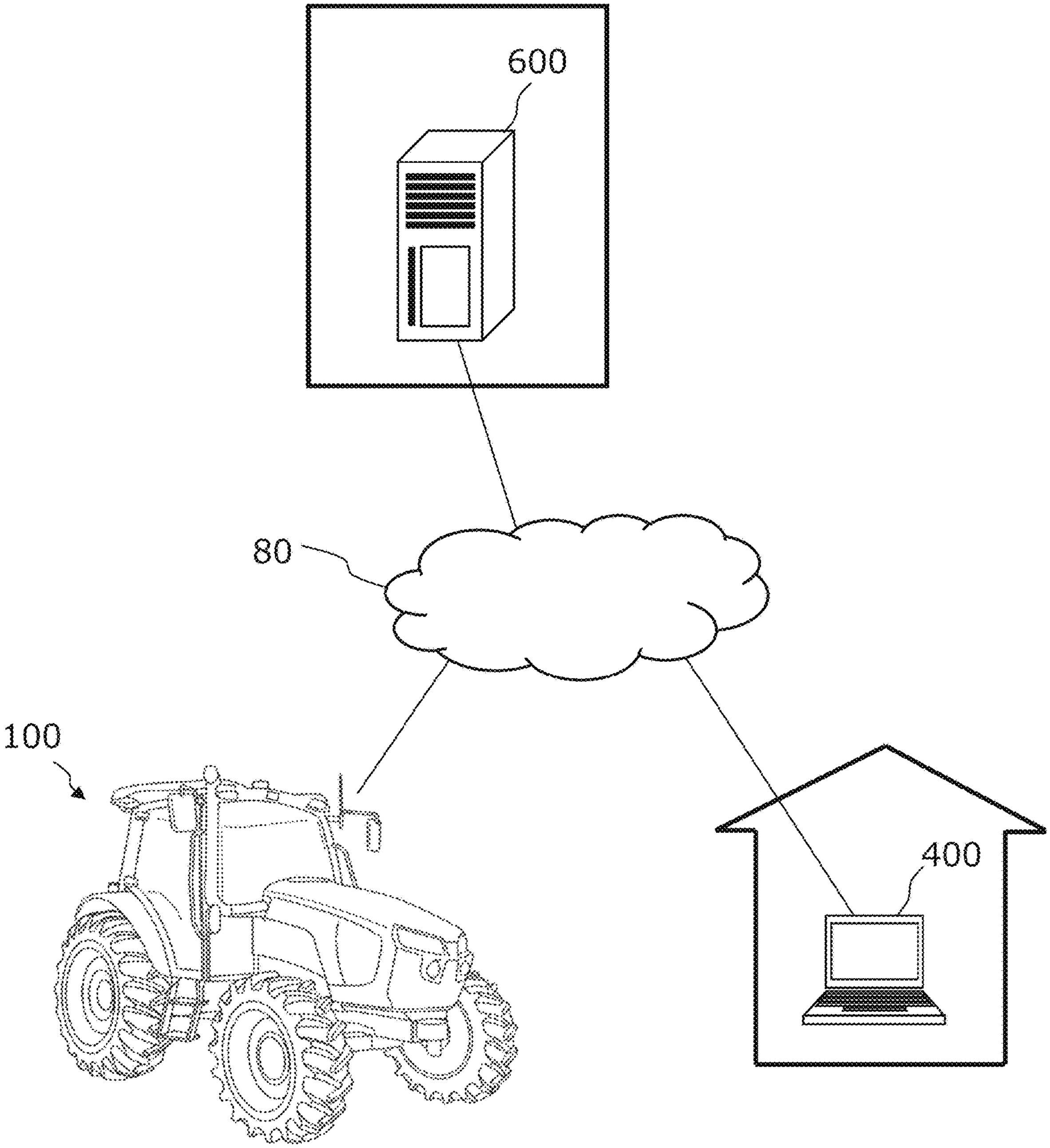
FIG. 1 is a diagram providing an overview of an agriculture management system according to an example embodiment of the present disclosure.

In the present disclosure, an "agricultural machine" refers to a machine for agricultural applications. Examples of agricultural machines include tractors, harvesters, rice transplanters, vehicles for crop management, vegetable transplanters, mowers, seeders, spreaders, and mobile robots for agriculture. Not only may a work vehicle such as a tractor function as an "agricultural machine" alone by itself, but also a combination of a work vehicle and an implement that is attached to, or towed by, the work vehicle may function as an "agricultural machine". For the ground surface inside a field, the agricultural machine performs agricultural work such as tilling, seeding, preventive pest control, manure spreading, planting of crops, or harvesting. Such agricultural work or tasks may be referred to as "groundwork", or simply as "work" or "tasks". Travel of a vehicle-type agricultural machine performed while the agricultural machine also performs agricultural work may be referred to as "tasked travel".

"Self-driving" refers to controlling the movement of an agricultural machine by the action of a controller, rather than through manual operations of a driver. An agricultural machine that performs self-driving may be referred to as a "self-driving agricultural machine" or a "robotic agricultural machine". During self-driving, not only the movement of the agricultural machine, but also the operation of agricultural work (e.g., the operation of the implement) may be controlled automatically. In the case where the agricultural machine is a vehicle-type machine, travel of the agricultural machine via self-driving will be referred to as "self-traveling". The controller may be configured or programmed to control at least one of steering that is required in the movement of the agricultural machine, adjustment of the moving speed, and beginning and ending of a move. In the case of controlling a work vehicle having an implement attached thereto, the controller may control raising or lowering of the implement, beginning and ending of an operation of the implement, and so on. A move based on self-driving may include not only moving of an agricultural machine that goes along a predetermined path toward a destination, but also moving of an agricultural machine that follows a target of tracking. An agricultural machine that performs self-driving may also move partly based on the user's instructions. Moreover, an agricultural machine that performs self-driving may operate not only in a self-driving mode but also in a manual driving mode, where the agricultural machine moves through manual operations of the driver. When performed not manually but through the action of a controller, the steering of an agricultural machine will be referred to as "automatic steering". A portion of, or an entirety of, the controller may reside outside the agricultural machine. Control signals, commands, data, etc. may be communicated between the agricultural machine and a controller residing outside the agricultural machine. An agricultural machine that performs self-driving may move autonomously while sensing the surrounding environment, without any person being involved in the controlling of the movement of the agricultural machine. An agricultural machine that is capable of autonomous movement is able to travel inside the field or outside the field (e.g., on roads) in an unmanned manner. During an autonomous move, operations of detecting and avoiding obstacles may be performed.

A "work plan" is data defining a plan of one or more tasks of agricultural work to be performed by an agricultural machine. The work plan may include, for example, information representing the order of the tasks of agricultural work to be performed by an agricultural machine or the field where each of the tasks of agricultural work is to be performed. The work plan may include information representing the time and the date when each of the tasks of agricultural work is to be performed. In particular, the work plan including information representing the time and the date when each of the tasks of agricultural work is to be performed is referred to as a "work schedule" or simply as a "schedule". The work schedule may include information representing the time when each task of agricultural work is to begin and/or end on each of working days. The work plan or the work schedule may include, for example, information representing, for each task of agricultural work, the contents of the task, the implement to be used, and/or the types and amounts of agricultural supplies to be used. As used herein, the term "agricultural supplies" refers to goods used for agricultural work to be performed by an agricultural machine. The agricultural supplies may also be referred to simply as "supplies". The agricultural supplies may include goods consumed by agricultural work such as, for example, agricultural chemicals, fertilizers, seeds, or seedlings. The work plan may be created by a processor communicating with the agricultural machine to manage the agricultural machine or a processor mounted on the agricultural machine. The processor can be configured or programmed to create a work plan based on, for example, information input by the user (agricultural business executive, agricultural worker, etc.) manipulating a terminal device. In this specification, the processor communicating with the agricultural machine to manage the agricultural machine will be referred to as a "management device". The management device may manage agricultural work of a plurality agricultural machines. In this case, the management device may create a work plan including information on each task of agricultural work to be performed by each of the plurality of agricultural machines. The work plan may be downloaded to each of the agricultural machines and stored in a storage in each of the agricultural machines. In order to perform the scheduled agricultural work in accordance with the work plan, each agricultural machine can automatically move to a field and perform the agricultural work.

An "environment map" is data representing, with a predetermined coordinate system, the position or the region of an object existing in the environment where the agricultural machine moves. The environment map may be referred to simply as a "map" or "map data". The coordinate system defining the environment map is, for example, a world coordinate system such as a geographic coordinate system fixed to the globe. Regarding the object existing in the environment, the environment map may include information other than the position (e.g., attribute information or other types of information). The "environment map" encompasses various type of maps such as a point cloud map and a lattice map. Data on a local map or a partial map that is generated or processed in a process of constructing the environment map is also referred to as a "map" or "map data".

An "agricultural road" is a road used mainly for agriculture. The "agricultural road" is not limited to a road paved with asphalt, and encompasses unpaved roads covered with soil, gravel or the like. The "agricultural road" encompasses roads (including private roads) on which only vehicle-type agricultural machines (e.g., work vehicles such as tractors, etc.) are allowed to pass and roads on which general vehicles (automobiles, trucks, buses, etc.) are also allowed to pass. The work vehicles may automatically travel on a general road in addition to an agricultural road. The "general road" is a road maintained for traffic of general vehicles.

A "feature" refers to an object existing on the earth. Examples of features include waterways, grass, trees, roads, fields, ditches, rivers, bridges, forests, mountains, rocks, buildings, railroad tracks, and the like. Borders, names of places, names of buildings, names of fields, names of railroad lines and the like, which do not exist in the real world, are not encompassed in the "feature" according to the present disclosure.

A "GNSS satellite" refers to an artificial satellite in the Global Navigation Satellite System (GNSS). GNSS is the general term for satellite positioning systems such as GPS (Global Positioning System), QZSS (Quasi-Zenith Satellite System), GLONASS, Galileo, and BeiDou. A GNSS satellite is a satellite in such a positioning system. A signal transmitted from a GNSS satellite is referred to as a "satellite signal". A "GNSS receiver" is a device to receive radio waves transmitted from a plurality of satellites in the GNSS and perform positioning based on a signal superposed on the radio waves. "GNSS data" is data output from the GNSS receiver. The GNSS data may be generated in a predetermined format such as, for example, the NMEA-0183 format. The GNSS data may include, for example, information representing a receiving state of the satellite signal received from each of the satellites. The GNSS data may include, for example, the identification number, the angle of elevation, the angle of direction, and a value representing the reception strength of each of the satellites from which the satellite signals are received. The reception strength is a numerical value representing the strength of each received satellite signal. The reception strength may be expressed by a value such as, for example, the carrier to noise density ratio (C/NO). The GNSS data may include positional information on the GNSS receiver or the agricultural machine, the positional information being calculated based on a plurality of received satellite signals. The positional information may be expressed by, for example, the latitude, the longitude and the altitude from the mean sea level. The GNSS data may further include information representing the reliability of the positional information.

The expression "satellite signals are receivable in a normal state" indicates that the satellite signals can be received stably such that the reliability of the positioning is not significantly lowered. A state where satellite signals cannot be received in a normal state may be expressed as a "reception failure of satellite signals" occurring. The "reception failure of satellite signals" is a state where the reliability of the positioning is lowered as compared with the normal receiving state, due to deterioration in the receiving state of the satellite signals. A reception failure may occur in the case where, for example, the number of detected satellites is small (e.g., three or less), the reception strength of each satellite signal is low, or multi-path is occurring. Whether or not a reception failure is occurring may be determined based on, for example, information on the satellites that is included in the GNSS data. It can be determined whether or not a reception failure is occurring based on, for example, the value of the reception strength of each of the satellites included in the GNSS data or the value of DOP (Dilution of Precision) representing the state of positional arrangement of the satellites.

A "global path" is data on a path connecting a departure point to a target point of an automatic movement of the agricultural machine, and is generated by a processor performing path planning. Generation of such a global path is referred to as "global path planning". In the following description, the global path will be referred to also as a "target path" or simply as a "path". The global path may be defined by, for example, coordinate values of a plurality of points which the agricultural machine is to pass. Such a point that the agricultural machine is to pass is referred as a "waypoint", and a line segment connecting waypoints adjacent to each other is referred to as a "link".

A "local path" is a path by which the agricultural machine can avoid an obstacle, and is consecutively generated while the agricultural machine is automatically moving along the global path. Generation of such a local path is referred to as "local path planning". The local path is consecutively generated based on data acquired by one or more sensors included in the agricultural machine, during a movement of the agricultural machine. The local path may be defined by a plurality of waypoints along a portion of the global path. Note that in the case where there is an obstacle in the vicinity of the global path, the waypoints may be set so as to detour around the obstacle. The length of a link between the waypoints on the local path is shorter than the length of a link between the waypoints on the global path. The device generating the local path may be the same as, or different from, the device generating the global path. For example, the management device managing the agricultural work to be performed by the agricultural machine may generate the global path, whereas the controller mounted on the agricultural machine may generate the local path. In this case, a combination of the management device and the controller may be configured or programmed to function as a "processor" performing the path planning. The controller of the agricultural machine may be configured or programmed to function as a processor performing both of global path planning and local path planning.

A "repository" is a site provided for storage of an agricultural machine. The repository may be, for example, a site managed by a user of an agricultural machine or a site run jointly by a plurality of users of agricultural machines. The repository may be, for example, a site saved for storage of an agricultural machine, such as a warehouse, a barn or a parking area at a house or an office of the user (agricultural worker, etc.). The position of the repository may be previously registered and recorded in a storage.

A "waiting area" is a site provided for an agricultural machine to wait while the agricultural machine does not perform agricultural work. One or more waiting areas may be provided in an environment where an agricultural machine performs self-driving. The above-described repository is an example of the waiting area. The waiting area may be managed or used jointly by a plurality of users. The waiting area may be, for example, a warehouse, a garage, a barn, a parking area, or any other facilities. The waiting area may be a warehouse, a barn, a garage or a parking area at a house or an office of an agricultural worker different from the user of the agricultural machine. A plurality of waiting areas may be scattered in the environment where an agricultural machine moves. In the waiting area, work such as replacement or maintenance of a part or an implement of the agricultural machine, or supplement of supplies, may be performed. In this case, parts, tools or supplies necessary for the work may be provided in the waiting area.

Hereinafter, example embodiments of the present disclosure will be described. Note, however, that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of the claims. In the following description, component elements having identical or similar functions are denoted by identical reference numerals.

Example embodiments of the present disclosure may be implemented using devices, systems, methods, integrated circuits, computer programs, non-transitory computer-readable storage media, or any combination thereof. The computer-readable storage media may be inclusive of volatile storage media or non-volatile storage media. The devices each may include a plurality of devices. In the case where one of the devices includes two or more devices, the two or more devices may be provided within a single apparatus, or divided over two or more separate apparatuses.

The following example embodiments are only examples, and the techniques according to the present disclosure is not limited to the following example embodiments. For example, numerical values, shapes, materials, steps, orders of steps, layout of a display screen, etc. that are indicated in the following example embodiments are only exemplary, and admit of various modifications so long as it makes technological sense. Any one implementation may be combined with another so long as it makes technological sense to do so.

Hereinafter, example embodiments in which techniques according to the present disclosure are applied to work vehicles, such as tractors, which is examples of agricultural machines, will be mainly described. The techniques according to example embodiments of the present disclosure are also applicable to other types of agricultural machines in addition to the work vehicle such as tractors.

FIG. 1 is a diagram providing an overview of an agriculture management system according to an example embodiment of the present disclosure. The agriculture management system shown in FIG. 1 includes a work vehicle 100, a terminal device 400, and a management device 600. The terminal device 400 is a computer usable by a user performing remote monitoring of the work vehicle 100. The management device 600 is a computer managed by a business operator operating the agriculture management system. The work vehicle 100, the terminal device 400 and the management device 600 can communicate with each other via the network 80. FIG. 1 shows one work vehicle 100, but the agriculture management system may include a plurality of the work vehicles or any other agricultural machine.

The work vehicle 100 according to the present example embodiment is a tractor, for example. The work vehicle 100 can have an implement attached to its rear and/or its front. While performing agricultural work in accordance with a particular type of implement, the work vehicle 100 is able to travel inside a field. The work vehicle 100 may travel inside the field or outside the field with no implement being attached thereto.

The work vehicle 100 has a self-driving function. In other words, the work vehicle 100 can travel by the action of a controller, rather than manually. The controller according to the present example embodiment is provided inside the work vehicle 100, and is configured or programmed to control both the speed and steering of the work vehicle 100. The work vehicle 100 can perform self-traveling outside the field (e.g., on roads) as well as inside the field.

The work vehicle 100 includes a device usable to position or localization, such as a GNSS receiver or a LiDAR sensor. Based on the position of the work vehicle 100 and information, on a target path, generated by the management device 600, the controller of the work vehicle 100 causes the work vehicle 100 to automatically travel. In addition to controlling the travel of the work vehicle 100, the controller also controls the operation of the implement. As a result, while automatically traveling inside the field, the work vehicle 100 is able to perform agricultural work by using the implement. In addition, the work vehicle 100 is able to automatically travel along the target path on a road outside the field (e.g., an agricultural road or a general road). In the case of performing self-traveling on a road outside the field, the work vehicle 100 travels while generating, along the target path, a local path along which the work vehicle 100 can avoid an obstacle, based on data output from a sensor such as a camera or a LiDAR sensor. Inside the field, the work vehicle 100 may travel while generating a local path in substantially the same manner as described above, or may perform an operation of traveling along the target path without generating a local path and halting when an obstacle is detected.

The management device 600 is a computer configured or programmed to manage the agricultural work performed by the work vehicle 100. The management device 600 may be, for example, a server computer configured or programmed to perform centralized management of information regarding the field on the cloud and supports agriculture by use of the data on the cloud. The management device 600, for example, can create a work plan for the work vehicle 100 and generate a target path for the work vehicle 100 in accordance with the work plan. Alternatively, the management device 600 may generate a target path for the work vehicle 100 in response to a manipulation performed by the user by use of the terminal device 400. Hereinafter, the target path for the work vehicle 100 generated by the management device 600 (that is, the global path) will be referred to simply as a "path", unless otherwise specified.

The management device 600 generates a target path inside the field and a target path outside the field by different methods from each other. The management device 600 generates a target path inside the field based on information regarding the field. For example, the management device 600 can generate a target path inside the field based on various types of previously registered information such as the outer shape of the field, the area size of the field, the position of the entrance/exit of the field, the width of the work vehicle 100, the width of the implement, the contents of the work, the types of crops to be grown, the region where the crops are to be grown, the growing states of the crops, and the interval between rows or ridges of the crops. The management device 600 generates a target path inside the field based on, for example, information input by the user by use of the terminal device 400 or any other device. The management device 600 generates a path inside the field such that the path covers, for example, the entirety of a work area where the work is to be performed. Meanwhile, the management device 600 generates a path outside the field in accordance with the work plan or the user's instructions. For example, the management device 600 can generate a target path outside the field based on various types of information such as the order of tasks of agricultural work indicated by the work plan, the position of the field where each task of agricultural work is to be performed, the position of the entrance/exit of the field, the time when each task of agricultural work is to begin and/or end, attribute information of each of roads recorded on the map, the state of the road surface, the state of weather, or the traffic state. The management device 600 may generate a target path based on information representing the path or the waypoints specified by the user manipulating the terminal device 400, without relying on the work plan.

In addition, the management device 600 may generate or edit an environment map based on data collected by the work vehicle 100 or any other movable body by use of the sensor such as a LiDAR sensor. The management device 600 transmits data on the work plan, the target path and the environment map thus generated to the work vehicle 100. The work vehicle 100 automatically moves and performs agricultural work based on the data.

The global path planning and the generation (or editing) of the environment map may be performed by any other device than the management device 600. For example, the controller of the work vehicle 100 may be configured or programmed to perform global path planning, or the generation or editing of the environment map.

The terminal device 400 is a computer that is usable by a user who is at a remote place from the work vehicle 100. The terminal device 400 shown in FIG. 1 is a laptop computer, but the terminal device 400 is not limited to this. The terminal device 400 may be a stationary computer such as a desktop PC (personal computer), or a mobile terminal such as a smartphone or a tablet computer. The terminal device 400 may be usable to perform remote monitoring of the work vehicle 100 or remote-manipulate the work vehicle 100. For example, the terminal device 400 can display, on a display screen thereof, a video captured by one or more cameras (imagers) included in the work vehicle 100. The user can watch the video to check the state of the surroundings of the work vehicle 100 and instruct the work vehicle 100 to halt or begin traveling. The terminal device 400 can also display, on the display screen thereof, a setting screen allowing the user to input information necessary to create a work plan (e.g., a schedule of each task of agricultural work) for the work vehicle 100. When the user inputs necessary information to the setting screen and performs a manipulation to transmit the information, the terminal device 400 transmits the input information to the management device 600. The management device 600 creates a work plan based on the information. The terminal device 400 may be used to register one or more fields where the work vehicle 100 is to perform agricultural work, the repository of the work vehicle 100, and one or more waiting areas where the work vehicle 100 is to temporarily wait. The terminal device 400 may further have a function of displaying, on a display screen thereof, a setting screen allowing the user to input information necessary to set a target path.

Hereinafter, a configuration and an operation of the system according to the present example embodiment will be described in more detail.

Figure 2:
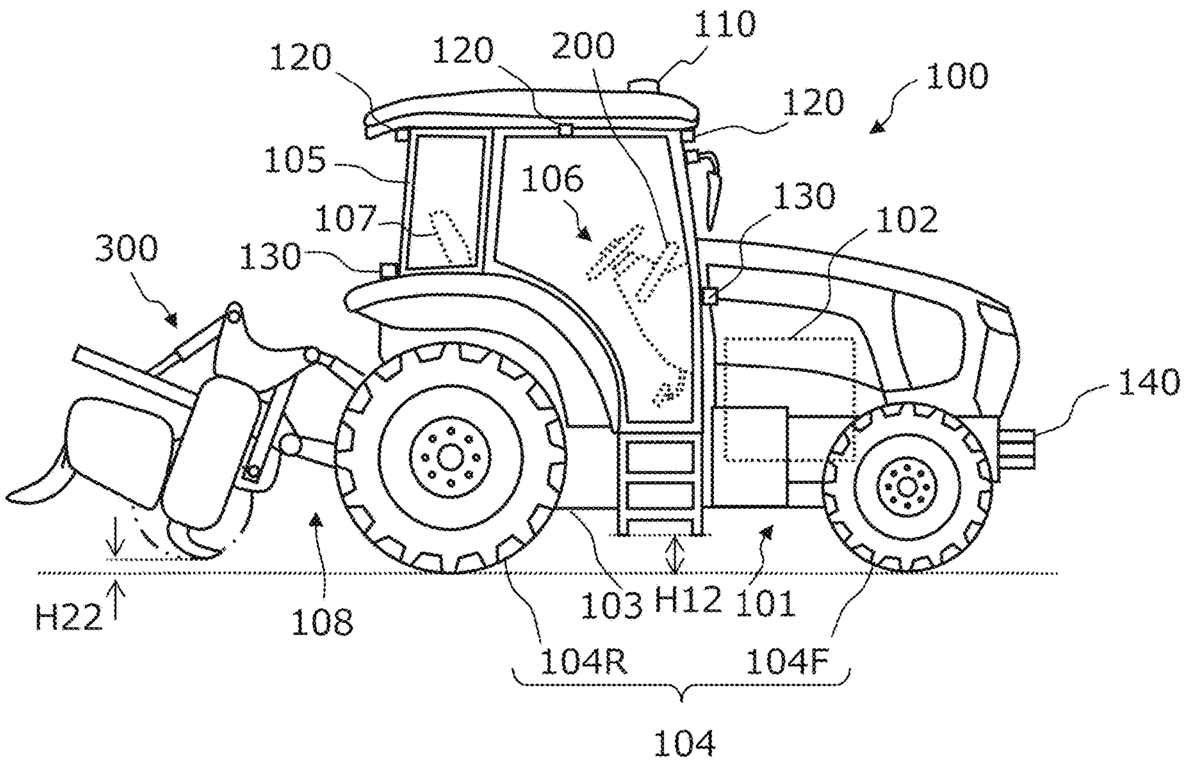
FIG. 2 is a side view schematically indicating an example of work vehicle and an example of implement that is linked to the work vehicle.

FIG. 2 is a side view schematically indicating an example of the work vehicle 100 and an example of implement 300 linked to the work vehicle 100. The work vehicle 100 according to the present example embodiment can operate both in a manual driving mode and a self-driving mode. In the self-driving mode, the work vehicle 100 is able to perform unmanned travel. The work vehicle 100 can perform self-driving both inside a field and outside the field.

As shown in FIG. 2, the work vehicle 100 includes a vehicle body 101, a prime mover (engine) 102, and a transmission 103. On the vehicle body 101, wheels 104 with tires and a cabin 105 are provided. The wheels 104 include a pair of front wheels 104F and a pair of rear wheels 104R. Inside the cabin 105, a driver's seat 107, a steering device 106, an operational terminal 200, and switches for manipulation are provided. In the case where the work vehicle 100 performs tasked travel inside the field, the front wheels 104F and/or the rear wheels 104R may be replaced with a plurality of wheels (crawlers) provided with continuous tracks, instead of being replaced with wheels provided with tires.

The work vehicle 100 includes at least one sensor to sense the surrounding environment of the work vehicle 100. In the example shown in FIG. 2, the work vehicle 100 includes a plurality of the sensors. The sensors include a plurality of cameras 120, a LiDAR sensor 140, and a plurality of obstacle sensors 130.

The cameras 120 be provided at the may front/rear/right/left of the work vehicle 100, for example. The cameras 120 image the surrounding environment of the work vehicle 100 and generate image data. The images acquired by the cameras 120 may be transmitted to the terminal device 400, which is responsible for remote monitoring. The images may be used to monitor the work vehicle 100 during unmanned driving. The cameras 120 may also be used to generate images to allow the work vehicle 100, traveling on a road outside the field (an agricultural road or a general road), to recognize objects, obstacles, white lines, road signs, traffic signs or the like in the surroundings of the work vehicle 100.

The LiDAR sensor 140 in the example shown in FIG. 2 is disposed on a bottom portion of a front surface of the vehicle body 101. The LiDAR sensor 140 may be disposed at any other position. For example, the LiDAR sensor 140 may be provided on a top portion of the cabin 105. The LiDAR sensor 140 is a 3D-LiDAR sensor, but alternatively may be a 2D-LiDAR sensor. The LiDAR sensor 140 senses the surrounding environment of the work vehicle 100 and outputs sensing data. While the work vehicle 100 is traveling, the LiDAR sensor 140 repeatedly outputs sensor data representing the distance and the direction between an object existing in the surrounding environment thereof and each of measurement points, or a two-dimensional or three-dimensional coordinate values of each of the measurement points. The sensor data output from the LiDAR sensor 140 is processed by the controller of the work vehicle 100. The controller can be configured or programmed to perform localization of the work vehicle 100 by matching the sensor data against the environment map. The controller can be configured or programmed to further detect an object such as an obstacle existing in the surroundings of the work vehicle 100 based on the sensor data. The controller can be configured or programmed to utilize an algorithm such as, for example, SLAM (Simultaneous Localization and Mapping) to generate or edit an environment map. The work vehicle 100 may include a plurality of LiDAR sensors disposed at different positions with different orientations.

The plurality of obstacle sensors 130 shown in FIG. 2 are provided at the front and the rear of the cabin 105. The obstacle sensors 130 may be disposed at other positions. For example, one or more obstacle sensors 130 may be disposed at any position at the sides, the front or the rear of the vehicle body 101. The obstacle sensors 130 may include, for example, a laser scanner or an ultrasonic sonar. The obstacle sensors 130 are used to detect obstacles in the surroundings of the work vehicle 100 during self-traveling to cause the work vehicle 100 to halt or detour around the obstacles. The LiDAR sensor 140 may be used as one of the obstacle sensors 130.

The work vehicle 100 further includes a GNSS unit 110. The GNSS unit 110 includes a GNSS receiver. The GNSS receiver may include an antenna to receive a signal(s) from a GNSS satellite(s) and a processor to calculate the position of the work vehicle 100 based on the signal(s) received by the antenna. The GNSS unit 110 receives satellite signals transmitted from the plurality of GNSS satellites, and performs positioning based on the satellite signals. GNSS is the general term for satellite positioning systems such as GPS (Global Positioning System), QZSS (Quasi-Zenith Satellite System; e.g., MICHIBIKI), GLONASS, Galileo, and BeiDou. Although the GNSS unit 110 according to the present example embodiment is disposed above the cabin 105, it may be disposed at any other position.

The GNSS unit 110 may include an inertial measurement unit (IMU). Signals from the IMU can be used to complement position data. The IMU can measure a tilt or a small motion of the work vehicle 100. The data acquired by the IMU can be used to complement the position data based on the satellite signals, so as to improve the performance of positioning.

The controller of the work vehicle 100 may be configured or programmed to utilize, for positioning, the sensing data acquired by the sensors such as the cameras 120 or the LIDAR sensor 140, in addition to the positioning results provided by the GNSS unit 110. In the case where objects serving as characteristic points exist in the environment that is traveled by the work vehicle 100, as in the case of an agricultural road, a forest road, a general road or an orchard, the position and the orientation of the work vehicle 100 can be estimated with a high accuracy based on data that is acquired by the cameras 120 or the LiDAR sensor 140 and based on an environment map that is previously stored in the storage. By correcting or complementing position data based on the satellite signals using the data acquired by the cameras 120 or the LiDAR sensor 140, it becomes possible to specify the position of the work vehicle 100 with a higher accuracy.

The prime mover 102 may be a diesel engine, for example. Instead of a diesel engine, an electric motor may be used. The transmission 103 can change the propulsion and the moving speed of the work vehicle 100 through a speed changing mechanism. The transmission 103 can also switch between forward travel and backward travel of the work vehicle 100.

The steering device 106 includes a steering wheel, a steering shaft connected to the steering wheel, and a power steering device to assist in the steering by the steering wheel. The front wheels 104F are the wheels responsible for steering, such that changing their angle of turn (also referred to as "steering angle") can cause a change in the traveling direction of the work vehicle 100. The steering angle of the front wheels 104F can be changed by manipulating the steering wheel. The power steering device includes a hydraulic device or an electric motor to supply an assisting force for changing the steering angle of the front wheels 104F. When automatic steering is performed, under the control of the controller disposed in the work vehicle 100, the steering angle may be automatically adjusted by the power of the hydraulic device or the electric motor.

A linkage device 108 ("link") is provided at the rear of the vehicle body 101. The linkage device 108 includes, e.g., a three-point linkage (also referred to as a "three-point link" or a "three-point hitch"), a PTO (Power Take Off) shaft, a universal joint, and a communication cable. The linkage device 108 allows the implement 300 to be attached to, or detached from, the work vehicle 100. The linkage device 108 is able to raise or lower the three-point link with a hydraulic device, for example, thus changing the position and/or attitude of the implement 300. Moreover, motive power can be sent from the work vehicle 100 to the implement 300 via the universal joint. While towing the implement 300, the work vehicle 100 allows the implement 300 to perform a predetermined task. The linkage device may be provided at the front of the vehicle body 101. In that case, the implement can be connected to the front of the work vehicle 100.

Although the implement 300 shown in FIG. 2 is a rotary tiller, the implement 300 is not limited to a rotary tiller. For example, any arbitrary implement such as a seeder, a spreader, a transplanter, a mower, a rake implement, a baler, a harvester, a sprayer, or a harrow, can be connected to the work vehicle 100 for use.

The work vehicle 100 shown in FIG. 2 can be driven by human driving; alternatively, it may only support unmanned driving. In that case, component elements which are only required for human driving, e.g., the cabin 105, the steering device 106, and the driver's seat 107 do not need to be provided in the work vehicle 100. An unmanned work vehicle 100 can travel via autonomous driving, or by remote operation by a user.

Figure 3:
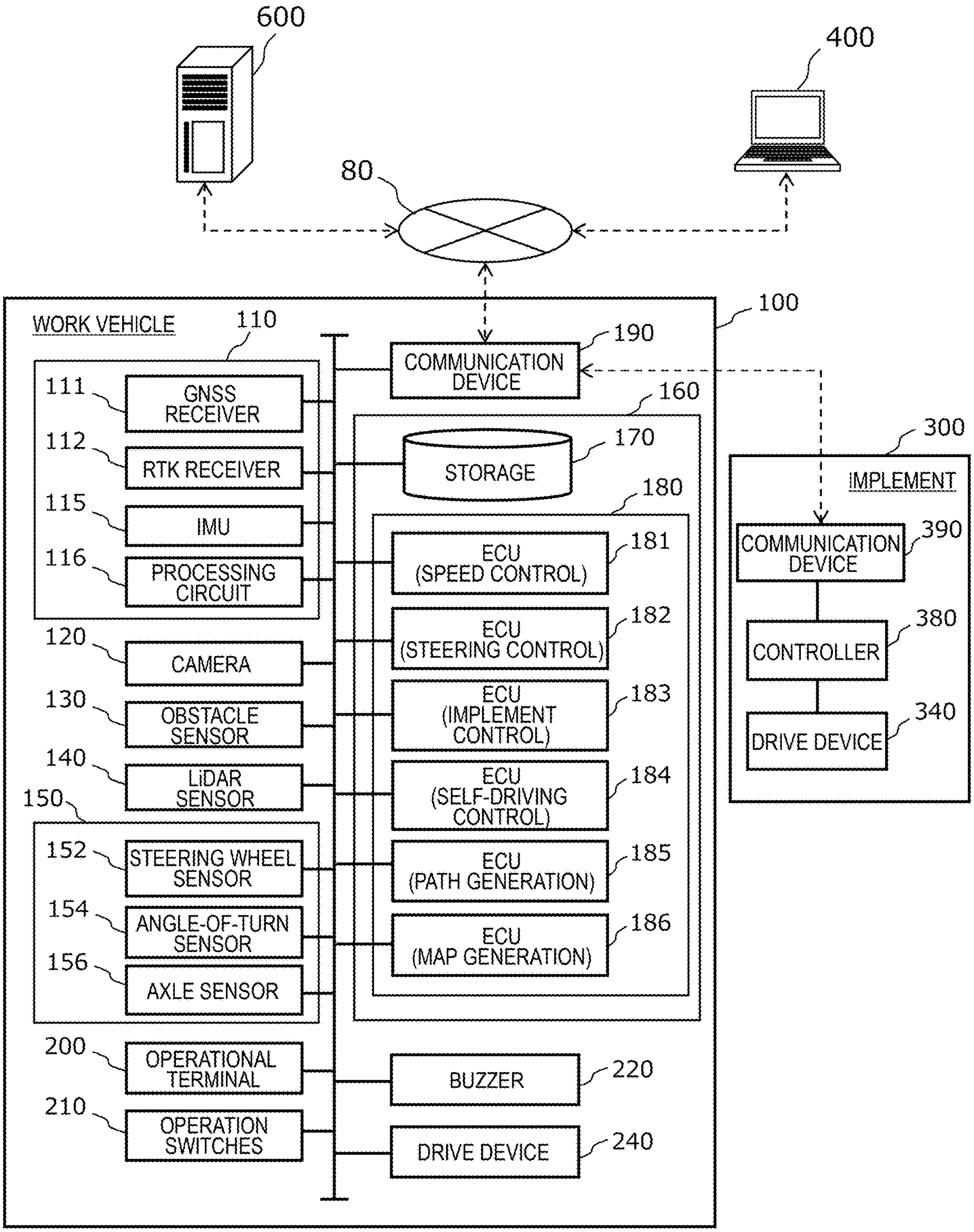
FIG. 3 is a block diagram indicating an example configuration of the work vehicle and the implement.

FIG. 3 is a block diagram indicating an example configuration of the work vehicle 100 and the implement 300. The work vehicle 100 and the implement 300 can communicate with each other via a communication cable that is included in the linkage device 108. The work vehicle 100 is able to communicate with the terminal device 400 and the management device 600 via the network 80.

In addition to the GNSS unit 110, the cameras 120, the obstacle sensors 130, the LiDAR sensor 140 and the operational terminal 200, the work vehicle 100 in the example of FIG. 3 includes sensors 150 to detect the operating status of the work vehicle 100, a control system 160, a communication device 190, operation switches 210, a buzzer 220, and a drive device 240. These component elements are communicably connected to each other via a bus. The GNSS unit 110 includes a GNSS receiver 111, an RTK receiver 112, an inertial measurement n unit (IMU) 115, and a processing circuit 116. The sensors 150 include a steering wheel sensor 152, an angle-of-turn sensor 154, and an axle sensor 156. The control system 160 includes a storage 170 and a controller 180. The controller 180 is configured or programmed to include a plurality of electronic control units (ECU) 181 to 186. The implement 300 includes a drive device 340, a controller 380, and a communication device 390. Note that FIG. 3 shows component elements which are relatively closely related to the operations of self-driving by the work vehicle 100, while other components are omitted from illustration.

The GNSS receiver 111 in the GNSS unit 110 receives satellite signals transmitted from the plurality of GNSS satellites and generates GNSS data based on the satellite signals. The GNSS data is generated in a predetermined format such as, for example, the NMEA-0183 format. The GNSS data may include, for example, the identification number, the angle of elevation, the angle of direction, and a value representing the reception strength of each of the satellites from which the satellite signals are received. The reception strength may be expressed by a value such as, for example, the carrier to noise density ratio (C/N0). The GNSS data may include positional information on the work vehicle 100 calculated based on a plurality of received satellite signals, and information representing the reliability of the positional information. The positional information may be expressed by, for example, the latitude, the longitude and the altitude from the mean sea level. The reliability of the positional information may be represented by, for example, a value of DOP, which represents the state of positional arrangement of the satellites.

Figure 4:
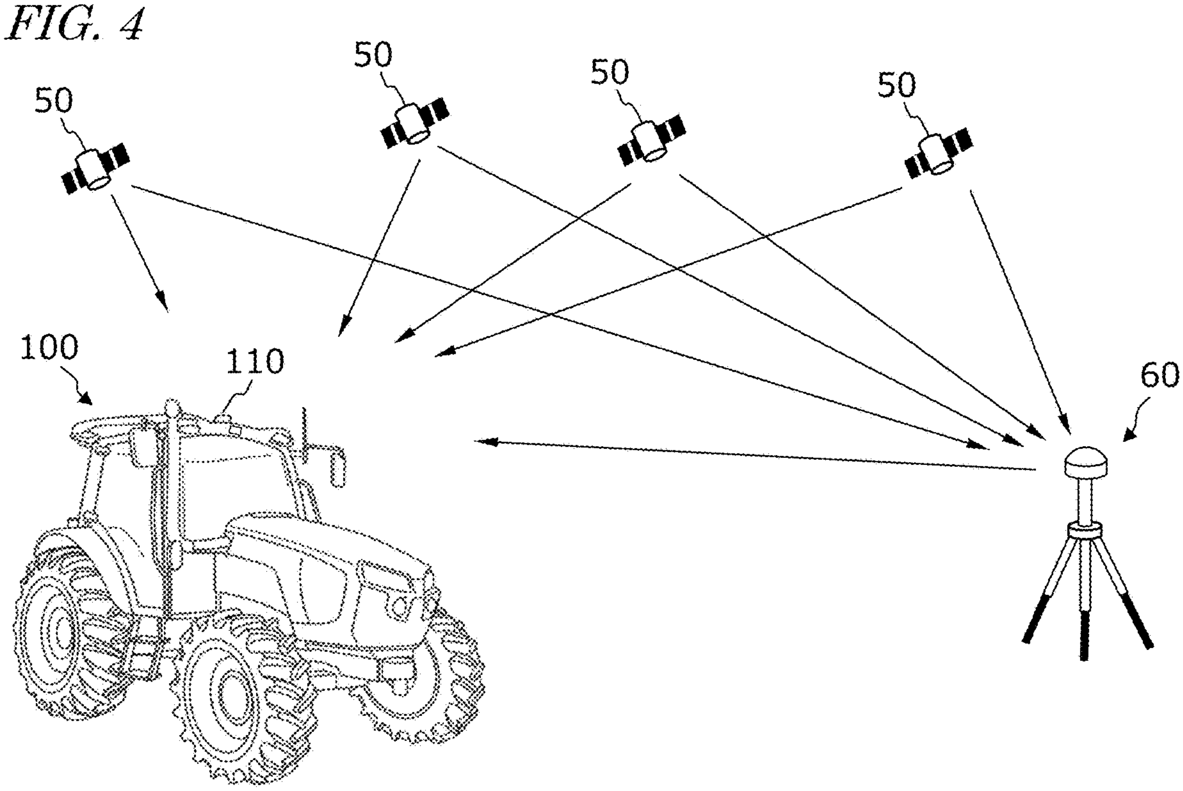
FIG. 4 is a conceptual diagram indicating an example of the work vehicle performing positioning based on an RTK-GNSS.

The GNSS unit 110 shown in FIG. 3 performs positioning of the work vehicle 100 by utilizing an RTK (Real Time Kinematic)-GNSS. FIG. 4 is a conceptual diagram indicating an example of the work vehicle 100 performing positioning based on the RTK-GNSS. In the positioning based on the RTK-GNSS, not only satellite signals transmitted from a plurality of GNSS satellites 50, but also a correction signal that is transmitted from a reference station 60 is used. The reference station 60 may be disposed near the field where the work vehicle 100 performs tasked travel (e.g., at a position within 10 km of the work vehicle 100). The reference station 60 generates a correction signal of, for example, an RTCM format based on the satellite signals received from the plurality of GNSS satellites 50, and transmits the correction signal to the GNSS unit 110. The RTK receiver 112, which includes an antenna and a modem, receives the correction signal transmitted from the reference station 60. Based on the correction signal, the processing circuit 116 of the GNSS unit 110 corrects the results of the positioning performed by use of the GNSS receiver 111. Use of the RTK-GNSS enables positioning with an accuracy on the order of several centimeters of errors, for example. Positional information including latitude, longitude, and altitude information is acquired through the highly accurate positioning by the RTK-GNSS. The GNSS unit 110 calculates the position of the work vehicle 100 as frequently as, for example, approximately one to ten times per second.

Note that the positioning method is not limited to being performed by use of an RTK-GNSS; any arbitrary positioning method (e.g., an interferometric positioning method or a relative positioning method) that provides positional information with the necessary accuracy can be used. For example, positioning may be performed by utilizing a VRS (Virtual Reference Station) or a DGPS (Differential Global Positioning System). In the case where positional information with the necessary accuracy can be obtained without the use of the correction signal transmitted from the reference station 60, positional information may be generated without using the correction signal. In that case, the GNSS unit 110 does not need to include the RTK receiver 112.

Even in the case where the RTK-GNSS is used, at a site where the correction signal from the reference station 60 cannot be acquired (e.g., on a road far from the field), the position of the work vehicle 100 is estimated by another method with no use of the signal from the RTK receiver 112. For example, the position of the work vehicle 100 may be estimated by matching the data output from the LiDAR sensor 140 and/or the cameras 120 against a highly accurate environment map.

The GNSS unit 110 according to the present example embodiment further includes the IMU 115. The IMU 115 may include a 3-axis accelerometer and a 3-axis gyroscope. The IMU 115 may include a direction sensor such as a 3-axis geomagnetic sensor. The IMU 115 functions as a motion sensor which can output signals representing parameters such as acceleration, velocity, displacement, and attitude of the work vehicle 100. Based not only on the satellite signals and the correction signal but also on a signal that is output from the IMU 115, the processing circuit 116 can estimate the position and orientation of the work vehicle 100 with a higher accuracy. The signal that is output from the IMU 115 may be used for the correction or complementation of the position that is calculated based on the satellite signals and the correction signal. The IMU 115 outputs a signal more frequently than the GNSS receiver 111. Utilizing this signal that is output highly frequently, the processing circuit 116 allows the position and orientation of the work vehicle 100 to be measured more frequently (e.g., about 10 Hz or above). Instead of the IMU 115, a 3-axis accelerometer and a 3-axis gyroscope may be separately provided. The IMU 115 may be provided as a separate device from the GNSS unit 110.

The cameras 120 are imagers that image the surrounding environment of the work vehicle 100. Each of the cameras 120 includes an image sensor such as a CCD (Charge Coupled Device) or a CMOS (Complementary Metal Oxide Semiconductor), for example. In addition, each camera 120 may include an optical system including one or more lenses and a signal processing circuit. During travel of the work vehicle 100, the cameras 120 image the surrounding environment of the work vehicle 100, and generate image data (e.g., motion picture data). The cameras 120 are able to capture motion pictures at a frame rate of 3 frames/second (fps: frames per second) or greater, for example. The images generated by the cameras 120 may be used by a remote supervisor to check the surrounding environment of the work vehicle 100 with the terminal device 400, for example. The images generated by the cameras 120 may also be used for the purpose of positioning and/or detection of obstacles. As shown in FIG. 2, the plurality of cameras 120 may be provided at different positions on the work vehicle 100, or a single camera 120 may be provided. A visible camera(s) to generate visible light images and an infrared camera(s) to generate infrared images may be separately provided. Both of a visible camera(s) and an infrared camera(s) may be provided as cameras for generating images for monitoring purposes. The infrared camera(s) may also be used for detection of obstacles at nighttime.

The obstacle sensors 130 detect objects existing in the surroundings of the work vehicle 100. Each of the obstacle sensors 130 may include a laser scanner or an ultrasonic sonar, for example. When an object exists at a position within a predetermined distance from one of the obstacle sensors 130, the obstacle sensor 130 outputs a signal indicating the presence of the obstacle. The plurality of obstacle sensors 130 may be provided at different positions on the work vehicle 100. For example, a plurality of laser scanners and a plurality of ultrasonic sonars may be disposed at different positions on the work vehicle 100. Providing such a great number of obstacle sensors 130 can reduce blind spots in monitoring obstacles in the surroundings of the work vehicle 100.

The steering wheel sensor 152 measures the angle of rotation of the steering wheel of the work vehicle 100. The angle-of-turn sensor 154 measures the angle of turn of the front wheels 104F, which are the wheels responsible for steering. Measurement values by the steering wheel sensor 152 and the angle-of-turn sensor 154 are used for steering control by the controller 180.

The axle sensor 156 measures the rotational speed, i.e., the number of revolutions per unit time, of an axle that is connected to the wheels 104. The axle sensor 156 may be a sensor including a magnetoresistive element (MR), a Hall generator, or an electromagnetic pickup, for example. The axle sensor 156 outputs a numerical value indicating the number of revolutions per minute (unit: rpm) of the axle, for example. The axle sensor 156 is used to measure the speed of the work vehicle 100.

The drive device 240 includes various types of devices required to cause the work vehicle 100 to travel and to drive the implement 300, for example, the prime mover 102, the transmission 103, the steering device 106, the linkage device 108 and the like described above. The prime mover 102 may include an internal combustion engine such as, for example, a diesel engine. The drive device 240 may include an electric motor for traction instead of, or in addition to, the internal combustion engine.

The buzzer 220 is an audio output device to present an alarm sound for alerting the user of an abnormality. For example, the buzzer 220 may present an alarm sound when an obstacle is detected during self-driving. The buzzer 220 is controlled by the controller 180.

The storage 170 includes one or more storage mediums such as a flash memory or a magnetic disc. The storage 170 stores various data that is generated by the GNSS unit 110, the cameras 120, the obstacle sensors 130, the LiDAR sensor 140, the sensors 150, and the controller 180. The data that is stored by the storage 170 may include map data on the environment where the work vehicle 100 travels (environment map) and data on a global path (target path) for self-driving. The environment map includes information on a plurality of fields where the work vehicle 100 performs agricultural work and roads around the fields. The environment map and the target path may be generated by a processing device (processor) in the management device 600. The controller 180 may have a function of generating or editing an environment map and a target path. The controller 180 can edit the environment map and the target path, acquired from the management device 600, in accordance with the environment where the work vehicle 100 travels. The storage 170 also stores data on a work plan received by the communication device 190 from the management device 600.

The work plan includes information on a plurality of tasks of agricultural work to be performed by the work vehicle 100 over a plurality of working days. The work plan may be, for example, data on a work schedule including information on the time when the work vehicle 100 is scheduled to perform each task of agricultural work on each of the working days.

The storage 170 also stores a computer program(s) to cause each of the ECUs in the controller 180 to perform various operations described below. Such a computer program(s) may be provided to the work vehicle 100 via a storage medium (e.g., a semiconductor memory, an optical disc, etc.) or through telecommunication lines (e.g., the Internet). Such a computer program(s) may be marketed as commercial software.

The controller 180 is configured or programmed to include the plurality of ECUs. The plurality of ECUs include, for example, the ECU 181 for speed control, the ECU 182 for steering control, the ECU 183 for implement control, the ECU 184 for self-driving control, the ECU 185 for path generation, and the ECU 186 for map creation.

The ECU 181 controls the prime mover 102, the transmission 103 and brakes included in the drive device 240, thus controlling the speed of the work vehicle 100.

The ECU 182 controls the hydraulic device or the electric motor included in the steering device 106 based on a measurement value of the steering wheel sensor 152, thus controlling the steering of the work vehicle 100.

In order to cause the implement 300 to perform a desired operation, the ECU 183 controls the operations of the three-point link, the PTO shaft and the like that are included in the linkage device 108. Also, the ECU 183 generates a signal to control the operation of the implement 300, and transmits this signal from the communication device 190 to the implement 300.

Based on data output from the GNSS unit 110, the cameras 120, the obstacle sensors 130, the LiDAR sensor 140 and the sensors 150, the ECU 184 performs computation and control for achieving self-driving. For example, the ECU 184 specifies the position of the work vehicle 100 based on the data output from at least one of the GNSS unit 110, the cameras 120 and the LiDAR sensor 140. Inside the field, the ECU 184 may determine the position of the work vehicle 100 based only on the data output from the GNSS unit 110. The ECU 184 may estimate or correct the position of the work vehicle 100 based on the data acquired by the cameras 120 or the LiDAR sensor 140. Use of the data acquired by the cameras 120 or the LiDAR sensor 140 allows the accuracy of the positioning to be further improved. Outside the field, the ECU 184 estimates the position of the work vehicle 100 by use of the data output from the LiDAR sensor 140 or the cameras 120. For example, the ECU 184 may estimate the position of the work vehicle 100 by matching the data output from the LiDAR sensor 140 or the cameras 120 against the environment map. During self-driving, the ECU 184 performs computation necessary for the work vehicle 100 to travel along a target path or a local path, based on the estimated position of the work vehicle 100. The ECU 184 sends the ECU 181 a command to change the speed, and sends the ECU 182 a command to change the steering angle. In response to the command to change the speed, the ECU 181 controls the prime mover 102, the transmission 103 or the brakes to change the speed of the work vehicle 100. In response to the command to change the steering angle, the ECU 182 controls the steering device 106 to change the steering angle.

While the work vehicle 100 is traveling along the target path, the ECU 185 consecutively generates a local path along which the work vehicle 100 can avoid an obstacle. During travel of the work vehicle 100, the ECU 185 recognizes an obstacle existing in the surroundings of the work vehicle 100 based on the data output from the cameras 120, the obstacle sensors 130 and the LiDAR sensor 140. The ECU 185 generates a local path such that the work vehicle 100 avoids the recognized obstacle.

The ECU 185 may have a function of performing global path planning instead of the management device 600. In this case, the ECU 185 determines a destination of the work vehicle 100 based on the work plan stored in the storage 170, and determines a target path from a beginning point to a target point of the movement of the work vehicle 100. The ECU 185 can create, as the target path, a path by which the work vehicle 100 can arrive at the destination within the shortest time period, based on the environment map stored in the storage 170 and including information on the roads. Alternatively, the ECU 185 may generate, as the target path, a path including a specific type of road (e.g., an agricultural road, a road along a specific feature such as a waterway or the like, or a road where satellite signals from GNSS satellites are receivable in a good condition) with priority, based on attribute information on each of the roads included in the environment map.

The ECU 186 generates or edits a map of the environment where the work vehicle 100 travels. In the present example embodiment, an environment map generated by an external device such as the management device 600 is transmitted to the work vehicle 100 and recorded in the storage 170. Instead, the ECU 186 can generate or edit an environment map. Hereinafter, an operation in a case where the ECU 186 generates an environment map will be described. An environment map may be generated based on sensor data output from the LiDAR sensor 140. For generating an environment map, the ECU 186 consecutively generates three-dimensional point cloud data based on the sensor data output from the LiDAR sensor 140 while the work vehicle 100 is traveling. The ECU 186 can generate an environment map by connecting the point cloud data consecutively generated by use of an algorithm such as, for example, SLAM. The environment map generated in this manner is a highly accurate three-dimensional map, and may be used for localization performed by the ECU 184. Based on this three-dimensional map, a two-dimensional map usable for the global path planning may be generated. In this specification, the three-dimensional map that is used for the localization and the two-dimensional map that is used for the global path planning will be both referred to as an "environment map". The ECU 186 can further edit the map by adding, to the map, various types of attribute information on a feature (e.g., a waterway, a river, grass, a tree, etc.), the type of road (e.g., whether it is an agricultural road or not), the state of the road surface, how easily the road is passable, or the like that is recognized based on the data output from the cameras 120 or the LiDAR sensor 140.

Through the actions of these ECUs, the controller 180 realizes self-driving. During self-driving, the controller 180 controls the drive device 240 based on the measured or estimated position of the work vehicle 100 and on the target path. As a result, the controller 180 can cause the work vehicle 100 to travel along the target path.

The plurality of ECUs included in the controller 180 can communicate with each other in compliance with a vehicle bus standard such as, for example, a CAN (Controller Area Network). Instead of the CAN, faster communication methods such as Automotive Ethernet (registered trademark) may be used. Although the ECUs 181 to 186 are illustrated as individual blocks in FIG. 3, the function of each of the ECU 181 to 186 may be implemented by a plurality of ECUs. Alternatively, an onboard computer that integrates the functions of at least some of the ECUs 181 to 186 may be provided. The controller 180 may include ECUs other than the ECUs 181 to 186, and any number of ECUs may be provided in accordance with functionality. Each ECU includes a processing circuit including one or more processors.

The communication device 190 is a device including a circuit communicating with the implement 300, the terminal device 400 and the management device 600. The communication device 190 includes circuitry to perform exchanges of signals complying with an ISOBUS standard such as ISOBUS-TIM, for example, between itself and the communication device 390 of the implement 300. This allows the implement 300 to perform a desired operation, or allows information to be acquired from the implement 300. The communication device 190 may further include an antenna and a communication circuit to exchange signals via the network 80 with communication devices of the terminal device 400 and the management device 600. The network 80 may include a 3G, 4G, 5G, or any other cellular mobile communications network and the Internet, for example. The communication device 190 may have a function of communicating with a mobile terminal that is used by a supervisor who is situated near the work vehicle 100. With such a mobile terminal, communication may be performed based on any arbitrary wireless communication standard, e.g., Wi-Fi (registered trademark), 3G, 4G, 5G or any other cellular mobile communication standard, or Bluetooth (registered trademark).

The operational terminal 200 is a terminal for the user to perform a manipulation related to the travel of the work vehicle 100 and the operation of the implement 300, and is also referred to as a virtual terminal (VT). The operational terminal 200 may include a display device such as a touch screen panel, and/or one or more buttons. The display device may be a display such as a liquid crystal display or an organic light-emitting diode (OLED) display, for example. By manipulating the operational terminal 200, the user can perform various manipulations, such as, for example, switching ON/OFF the self-driving mode, recording or editing an environment map, setting a target path, and switching ON/OFF the implement 300. At least a portion of these manipulations may also be realized by manipulating the operation switches 210. The operational terminal 200 may detachable from the work vehicle 100. A user who is at a remote place from the work vehicle 100 may manipulate the detached operational terminal 200 to control the operation of the work vehicle 100. Instead of the operational terminal 200, the user may manipulate a computer on which necessary application software is installed, for example, the terminal device 400, to control the operation of the work vehicle 100.

Figure 5:
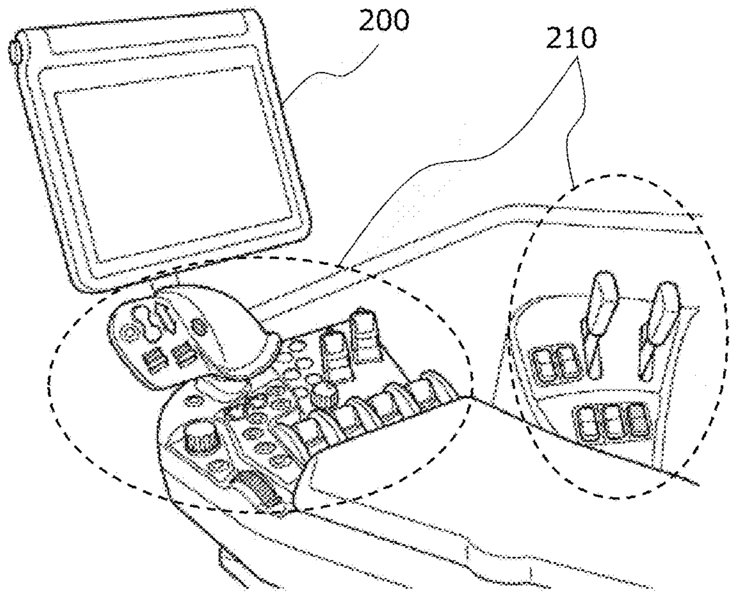
FIG. 5 is a diagram indicating an example of operational terminal and an example of operation switches disposed in a cabin.

FIG. 5 is a diagram indicating an example of the operational terminal 200 and an example of the operation switches 210 both provided in the cabin 105. In the cabin 105, the operation switches 210, a plurality of including switches that are manipulable to the user, are disposed. The operation switches 210 may include, for example, a switch to select the gear shift as to a main gear shift or a range gear shift, a switch to switch between a self-driving mode and a manual driving mode, a switch to switch between forward travel and backward travel, a switch to raise or lower the implement 300, and the like. In the case where the work vehicle 100 only performs unmanned driving and lacks human driving functionality, the work vehicle 100 does not need to include the operation switches 210.

The drive device 340 in the implement 300 shown in FIG. 3 performs operations necessary for the implement 300 to perform predetermined work. The drive device 340 includes a device suitable for uses of the implement 300, for example, a hydraulic device, an electric motor, a pump or the like. The controller 380 is configured or programmed to control the operation of the drive device 340. In response to a signal that is transmitted from the work vehicle 100 via the communication device 390, the controller 380 causes the drive device 340 to perform various operations. Moreover, a signal that is in accordance with the state of the implement 300 can be transmitted from the communication device 390 to the work vehicle 100.

Figure 6:
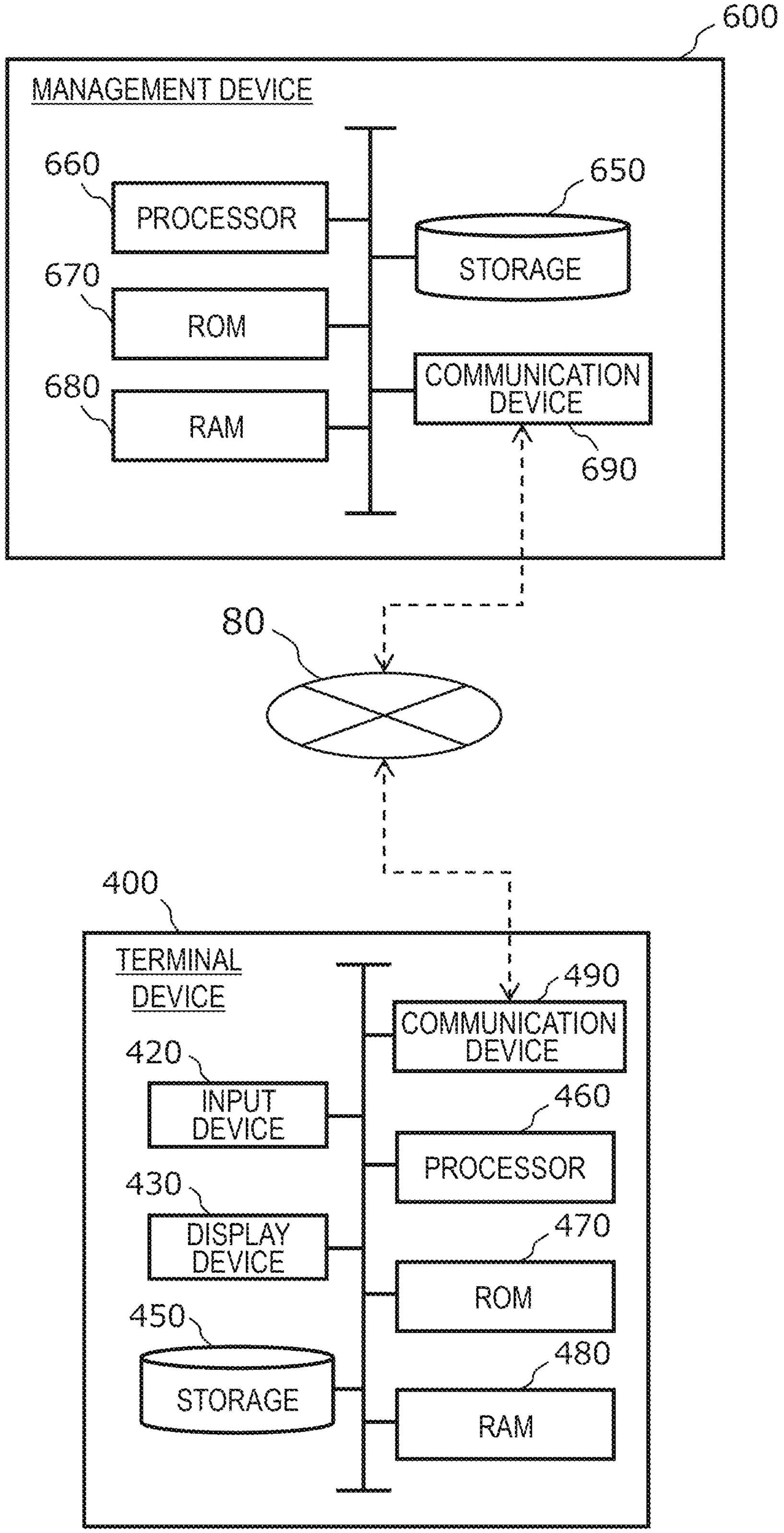
FIG. 6 is a block diagram indicating an example of hardware configuration of a management device and a terminal device.

Now, a configuration of the management device 600 and the terminal device 400 will be described with reference to FIG. 6. FIG. 6 is a block diagram indicating an example of schematic hardware configuration of the management device 600 and the terminal device 400.

The management device 600 includes a storage 650, a processor 660, a ROM (Read Only Memory) 670, a RAM (Random Access Memory) 680, and a communication device 690. These component elements are communicably connected to each other via a bus. The management device 600 may function as a cloud server to manage the schedule of the agricultural work to be performed by the work vehicle 100 in a field and support agriculture by use of the data managed by the management device 600 itself. The user can input information necessary to create a work plan by use of the terminal device 400 and upload the information to the management device 600 via the network 80. The management device 600 can create a schedule of agricultural work, that is, a work plan based on the information. The management device 600 can further generate or edit an environment map. The environment map may be distributed from a computer external to the management device 600.

The communication device 690 is a communication module to communicate with the work vehicle 100 and the terminal device 400 via the network 80. The communication device 690 can perform wired communication in compliance with communication standards such as, for example, IEEE1394 (registered trademark) or Ethernet (registered trademark). The communication device 690 may perform wireless communication in compliance with Bluetooth (registered trademark) or Wi-Fi, or cellular mobile communication based on 3G, 4G, 5G or any other cellular mobile communication standard.

The processor 660 may be, for example, a semiconductor integrated circuit including a central processing unit (CPU). The processor 660 may be realized by a microprocessor or microcontroller. Alternatively, the processor 660 may be realized by an FPGA (Field Programmable Gate Array), a GPU (Graphics Processing Unit), an ASIC (Application Specific Integrated Circuit) or an ASSP (Application Specific Standard Product) each including a CPU, or a combination of two or more selected from these circuits. The processor 660 is configured or programmed to consecutively execute a computer program, describing commands to execute at least one process, stored in the ROM 670 and thus realizes a desired process.

The ROM 670 is, for example, a writable memory (e. g., PROM), a rewritable memory (e.g., flash memory) or a memory which can only be read from but cannot be written to. The ROM 670 stores a program to control operations of the processor 660. The ROM 670 does not need to be a single storage medium, and may be an assembly of a plurality of storage mediums. A portion of the assembly of the plurality of storage memories may be a detachable memory.

The RAM 680 provides a work area in which the control program stored in the ROM 670 is once developed at the time of boot. The RAM 680 does not need to be a single storage medium, and may be an assembly of a plurality of storage mediums.

The storage 650 mainly functions as a storage for a database. The storage 650 may be, for example, a magnetic storage or a semiconductor storage. An example of the magnetic storage is a hard disc drive (HDD). An example of the semiconductor storage is a solid state drive (SSD). The storage 650 may be a device independent from the management device 600. For example, the storage 650 may be a storage connected to the management device 600 via the network 80, for example, a cloud storage.

The terminal device 400 includes an input device 420, a display device 430, a storage 450, a processor 460, a ROM 470, a RAM 480, and a communication device 490. These component elements are communicably connected to each other via a bus. The input device 420 is a device to convert an instruction from the user into data and input the data to a computer. The input device 420 may be, for example, a keyboard, a mouse or a touch panel. The display device 430 may be, for example, a liquid crystal display or an organic EL display. The processor 460, the ROM 470, the RAM 480, the storage 450 and the communication device 490 are substantially the same as the corresponding component elements described above regarding the example of the hardware configuration of the management device 600, and will not be described in repetition.

Now, an operation of the work vehicle 100, the terminal device 400 and the management device 600 will be described.

First, an example operation of self-traveling of the work vehicle 100 will be described. The work vehicle 100 according to the present example embodiment can automatically travel both inside and outside a field. Inside the field, the work vehicle 100 drives the implement 300 to perform predetermined agricultural work while traveling along a preset target path. When detecting an obstacle by the obstacle sensors 130 thereof while traveling inside the field, the work vehicle 100 may, for example, halt traveling and perform operations of presenting an alarm sound from the buzzer 220, transmitting an alert signal to the terminal device 400 and the like. Inside the field, the positioning of the work vehicle 100 is performed based mainly on data output from the GNSS unit 110. Meanwhile, outside the field, the work vehicle 100 automatically travels along a target path set for an agricultural road or a general road outside the field. While traveling outside the field, the work vehicle 100 uses data acquired by the cameras 120 or the LiDAR 140. When an obstacle is detected outside the field, the work vehicle 100, for example, avoids the obstacle or halts at the point. Outside the field, the position of the work vehicle 100 may be estimated based on data output from the LiDAR sensor 140 or the cameras 120 in addition to positioning data output from the GNSS unit 110.

Hereinafter, an example operation of the work vehicle 100 performing self-traveling inside the field will be described.

Figure 7:
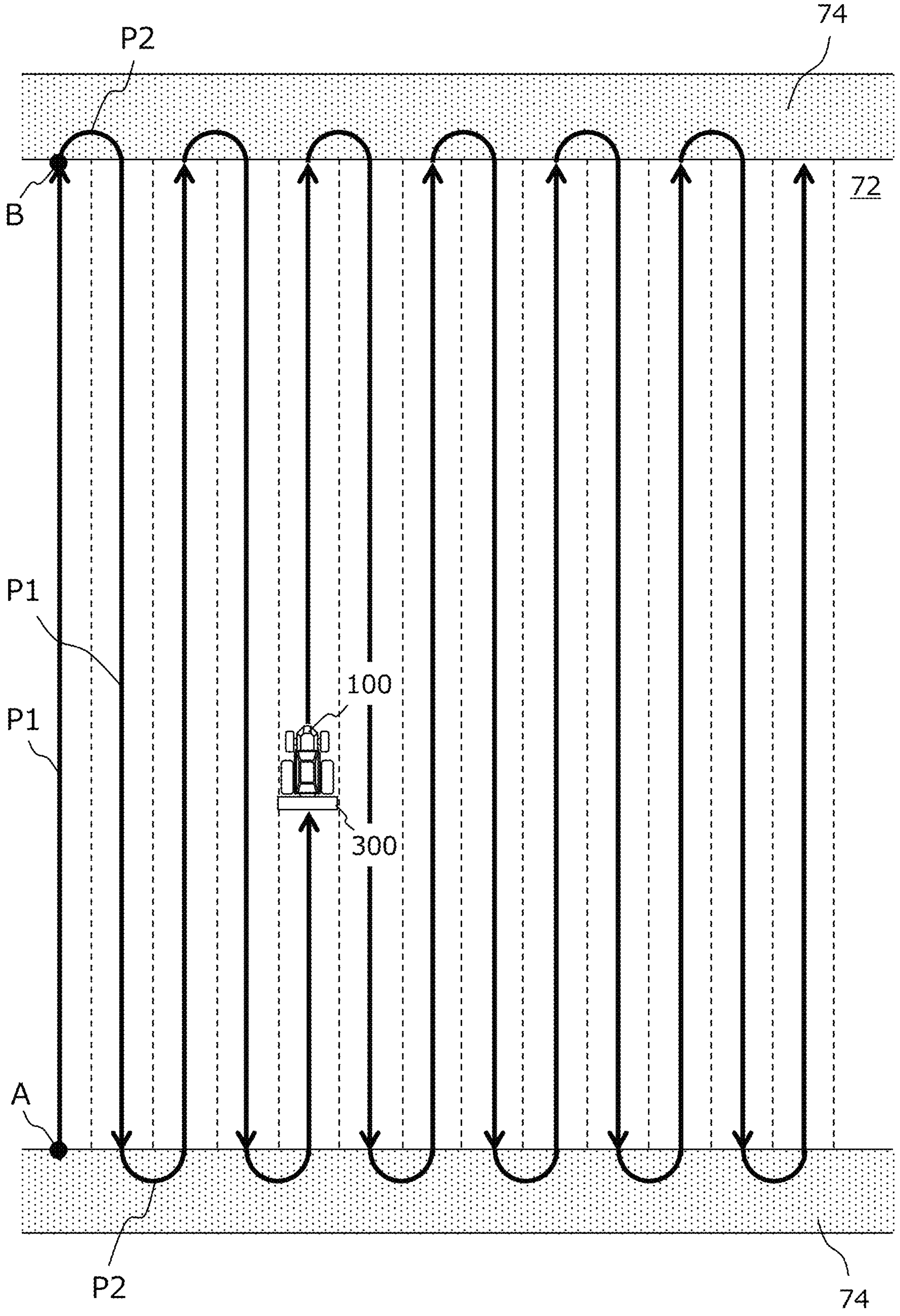
FIG. 7 is a diagram schematically indicating an example of the work vehicle automatically traveling along a target path inside a field.

FIG. 7 is a diagram schematically indicating an example of the work vehicle 100 automatically traveling along a target path in a field. In this example, the field includes a work area 72, in which the work vehicle 100 performs work by using the implement 300, and headlands 74, which are located near outer edges of the field. The user may previously specify which regions of the field on the map would correspond to the work area 72 and the headlands 74. The target path in this example includes a plurality of main paths P1 parallel to each other and a plurality of turning paths P2 interconnecting the plurality of main paths P1. The main paths P1 are located in the work area 72, whereas the turning paths P2 are located in the headlands 74. Although each of the main paths P1 in FIG. 7 is illustrated as a linear path, each main path P1 may also include a curved portion(s). The main paths P1 may be automatically generated by, for example, the user performing a manipulation of designating two points in the vicinity of ends of the field (points A and B in FIG. 7) while looking at the map of the field displayed on the operational terminal 200 or the terminal device 400. In this case, the plurality of main paths P1 are set to be parallel to a line segment connecting the point A and the point B designated by the user, the main paths P1 are connected to each other with the turning paths P2, and thus the target path inside the field is generated. Broken lines in FIG. 7 depict the working breadth of the implement 300. The working breadth is previously set and recorded in the storage 170. The working breadth may be set and recorded by the user manipulating the operational terminal 200 or the terminal device 400. Alternatively, the working breadth may be automatically recognized and recorded when the implement 300 is connected to the work vehicle 100. The interval between the plurality of main paths P1 may be set so as to be matched to the working breadth. The target path may be generated based on the manipulation made by the user, before self-driving is begun. The target path may be generated so as to cover the entire work area 72 in the field, for example. Along the target path shown in FIG. 7, the work vehicle 100 automatically travels while repeating a reciprocating motion from a beginning point of work to an ending point of work. Note that the target path shown in FIG. 7 is merely an example, and the target path may be arbitrarily determined.

Now, an example control performed by the controller 180 during self-driving inside the field will be described.

Figure 8:
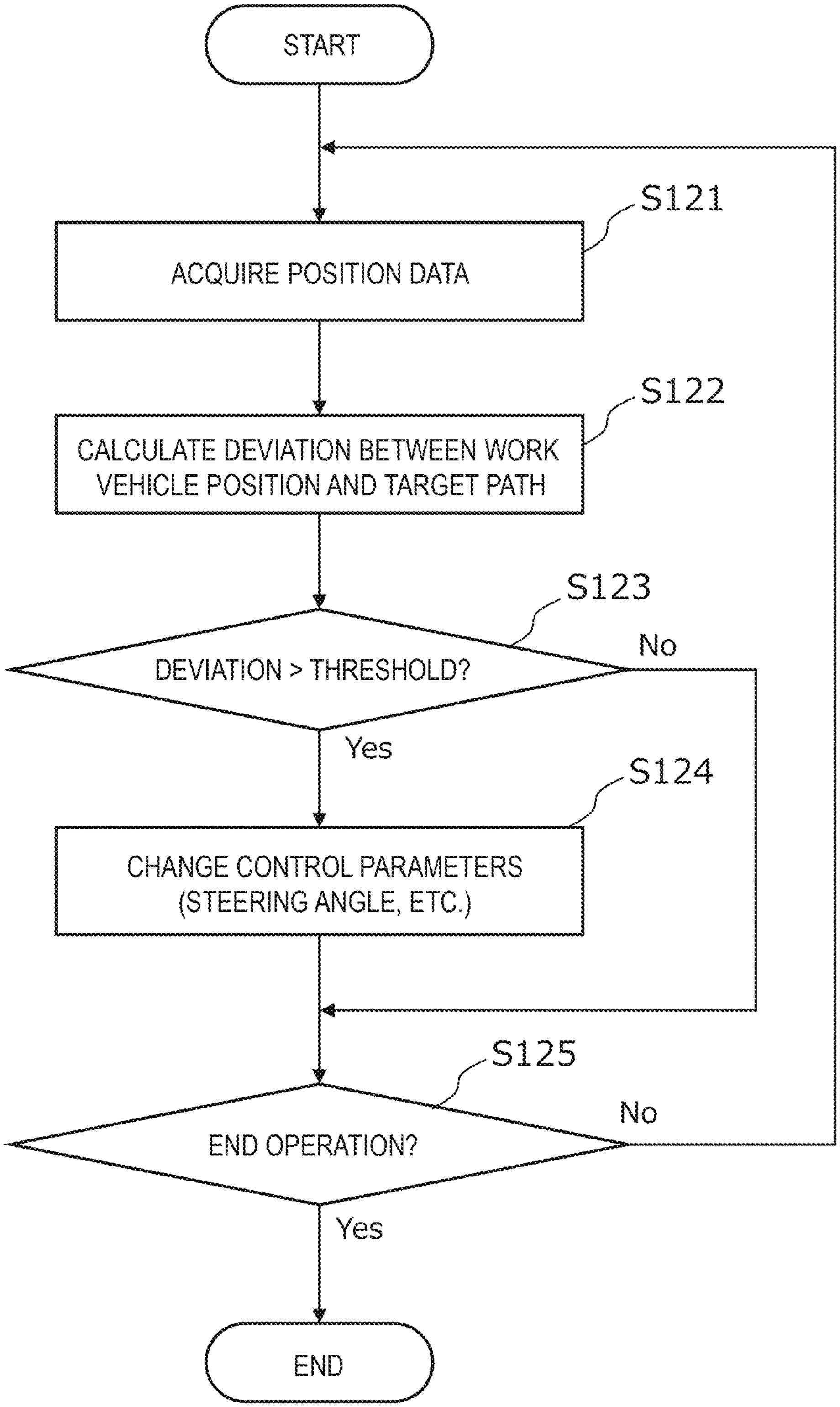
FIG. 8 is a flowchart indicating an example operation of steering control during self-driving.

FIG. 8 is a flowchart indicating an example operation of steering control to be performed by the controller 180 during self-driving. During travel of the work vehicle 100, the controller 180 performs automatic steering by performing the operation from steps S121 to S125 shown in FIG. 8. The speed of the work vehicle 100 will be maintained at a preset speed, for example. During travel of the work vehicle 100, the controller 180 acquires data representing the position of the work vehicle 100 that is generated by the GNSS unit 110 (step S121). Next, the controller 180 calculates a deviation between the position of the work vehicle 100 and the target path (step S122). The deviation represents the distance between the position of the work vehicle 100 and the target path at that moment. The controller 180 determines whether the calculated deviation in position exceeds the preset threshold or not (step S123). If the deviation exceeds the threshold, the controller 180 changes a control parameter of the steering device included in the drive device 240 so as to reduce the deviation, thus changing the steering angle. If the deviation does not exceed the threshold at step S123, the operation of step S124 is omitted. At the following step S125, the controller 180 determines whether a command to end the operation has been received or not. The command to end the operation may be given when the user has instructed that self-driving be suspended through remote operations, or when the work vehicle 100 has arrived at the destination, for example. If the command to end the operation has not been given, the control returns to step S121 and the controller 180 performs substantially the same operation based on a newly measured position of the work vehicle 100. The controller 180 repeats the operation from steps S121 to S125 until a command to end the operation is given. The aforementioned operation is executed by the ECUs 182 and 184 in the controller 180.

In the example shown in FIG. 8, the controller 180 controls the drive device 240 based only on the deviation between the position of the work vehicle 100 as specified by the GNSS unit 110 and the target path. Alternatively, a deviation in terms of directions may further be considered in the control. For example, when a directional deviation exceeds a preset threshold, where the directional deviation is an angle difference between the orientation of the work vehicle 100 as specified by the GNSS unit 110 and the direction of the target path, the controller 180 may change the control parameter of the steering device of the drive device 240 (e.g., steering angle) in accordance with the deviation.

Hereinafter, with reference to FIGS. 9A to 9D, an example of steering control by the controller 180 will be described more specifically.

Figure 9A:
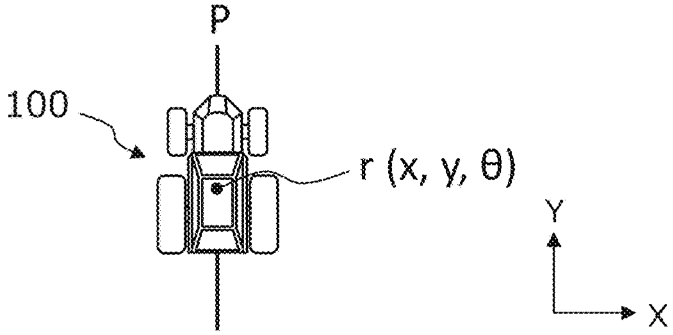
FIG. 9A is a diagram indicating an example of the work vehicle traveling along a target path P.
Figure 9B:
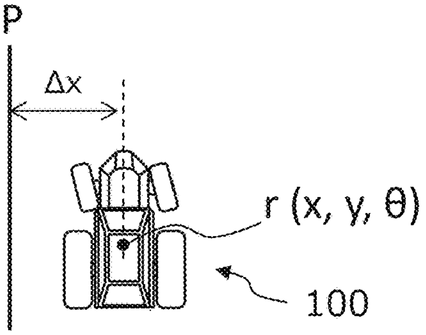
FIG. 9B is a diagram indicating an example of the work vehicle at a position which is shifted rightward from the target path P.
Figure 9C:
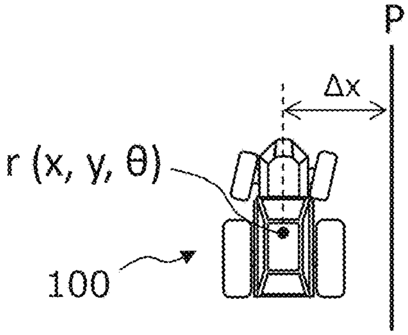
FIG. 9C is a diagram indicating an example of the work vehicle at a position which is shifted leftward from the target path P.
Figure 9D:
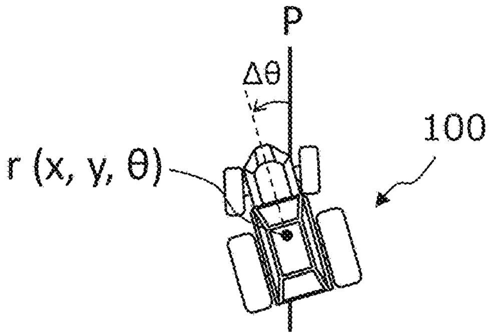
FIG. 9D is a diagram indicating an example of the work vehicle oriented in an inclined direction with respect to the target path P.

FIG. 9A is a diagram indicating an example of the work vehicle 100 traveling along a target path P. FIG. 9B is a diagram indicating an example of the work vehicle 100 at a position which is shifted rightward from the target path P. FIG. 9C is a diagram indicating an example of the work vehicle 100 at a position which is shifted leftward from the target path P. FIG. 9D is a diagram indicating an example of the work vehicle 100 oriented in an inclined direction with respect to the target path P. In these figures, the pose, i.e., the position and orientation, of the work vehicle 100 as measured by the GNSS unit 110 is expressed as $r(x, y, \theta)$. Herein, $(x, y)$ are coordinates representing the position of a reference point on the work vehicle 100 in an XY coordinate system, which is a two-dimensional coordinate system fixed to the globe. In the examples shown in FIGS. 9A to 9D, the reference point on the work vehicle 100 is at a position, on the cabin, where a GNSS antenna is disposed, but the reference point may be at any arbitrary position. $\theta$ is an angle representing the measured orientation of the work vehicle 100. Although the target path P is shown parallel to the Y axis in the examples illustrated in these figures, the target path P may not necessarily be parallel to the Y axis, in general.

As shown in FIG. 9A, in the case where the position and orientation of the work vehicle 100 are not deviated from the target path P, the controller 180 maintains the steering angle and speed of the work vehicle 100 without changing them.

As shown in FIG. 9B, when the position of the work vehicle 100 is shifted rightward from the target path P, the controller 180 changes the steering angle so that the traveling direction of the work vehicle 100 will be inclined leftward, thus bringing the work vehicle 100 closer to the path P. At this point, not only the steering angle but also the speed may be changed. The magnitude of the steering angle may be adjusted in accordance with the magnitude of a positional deviation $\Delta x$, for example.

As shown in FIG. 9C, when the position of the work vehicle 100 is shifted leftward from the target path P, the controller 180 changes the steering angle so that the traveling direction of the work vehicle 100 will be inclined rightward, thus bringing the work vehicle 100 closer to the path P. In this case, too, not only the steering angle but also the speed may be changed. The amount of change of the steering angle may be adjusted in accordance with the magnitude of the positional deviation $\Delta x$, for example.

As shown in FIG. 9D, in the case where the position of the work vehicle 100 is not considerably deviated from the target path P but its orientation is nonetheless different from the direction of the target path P, the controller 180 changes the steering angle so that the directional deviation $\Delta\theta$ will become smaller. In this case, too, not only the steering angle but also the speed may be changed. The magnitude of the steering angle may be adjusted in accordance with the magnitudes of the positional deviation $\Delta x$ and the directional deviation $\Delta\theta$, for example. For instance, the amount of change of the steering angle (which is in accordance with the directional deviation $\Delta\theta$) may be increased as the absolute value of the positional deviation $\Delta x$ decreases. When the positional deviation $\Delta x$ has a large absolute value, the steering angle will be changed greatly in order for the work vehicle 100 to return to the path P, so that the directional deviation $\Delta\theta$ will inevitably have a large absolute value. Conversely, when the positional deviation $\Delta x$ has a small absolute value, the directional deviation $\Delta\theta$ needs to become closer to zero. Therefore, it may be advantageous to introduce a relatively large weight (i.e., control gain) for the directional deviation $\Delta\theta$ in determining the steering angle.

For the steering control and speed control of the work vehicle 100, control techniques such as PID control or MPC (Model Predictive Control) may be applied. Applying these control techniques will make for smoothness of the control of bringing the work vehicle 100 closer to the target path P.

Note that, when an obstacle is detected by one or more obstacle sensors 130 during travel, the controller 180, for example, halts the work vehicle 100. At this point, the controller 180 may cause the buzzer 220 to present an alarm sound or may transmit an alert signal to the terminal device 400. In the case where the obstacle is avoidable, the controller 180 may locally generate a path along which the obstacle is avoidable and control the drive device 240 such that the work vehicle 100 travels along the path.

The work vehicle 100 according to the present example embodiment can perform self-traveling outside a field as well as inside the field. Outside the field, the controller 180 is able to detect an object located at a relatively distant position from the work vehicle 100 (e.g., another vehicle, a pedestrian, etc.) based on data output from the cameras 120 or the LiDAR sensor 140. The controller 180 generates a local path such that the local path avoids the detected object, and performs speed control and steering control along the local path. In this manner, self-traveling on a road outside the field can be realized.

Figure 10:
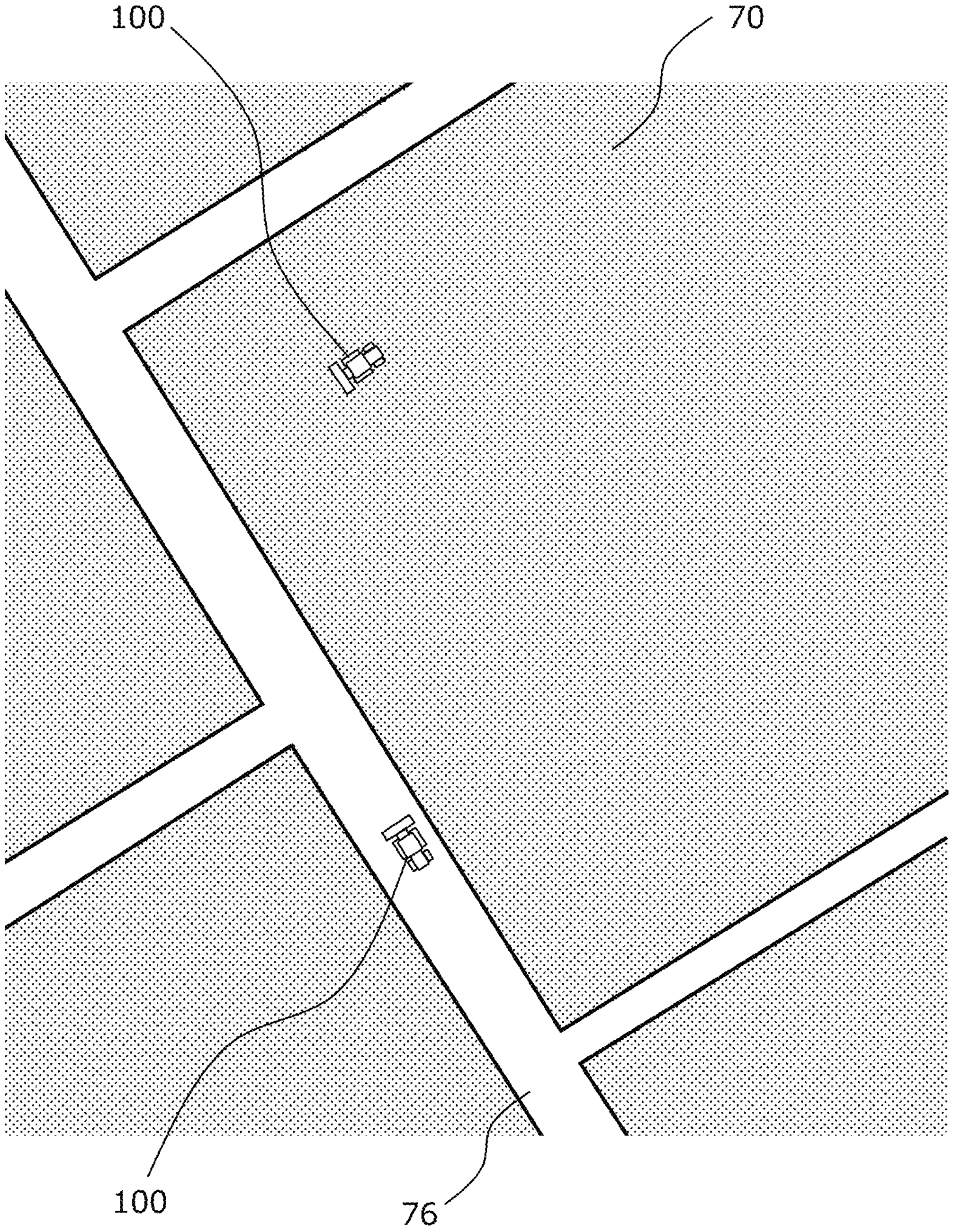
FIG. 10 is a diagram schematically indicating an example of state where a plurality of the work vehicles perform self-traveling inside a field and on a road outside the field.

As described above, the work vehicle 100 according to the present example embodiment can automatically travel inside the field and outside the field in an unmanned manner. FIG. 10 is a diagram schematically an example of state where a plurality of the work vehicles 100 are performing self-traveling inside a field 70 and on a road 76 outside the field 70. In the storage 170, an environment map of a region including a plurality of fields and roads around the fields, and a target path, are recorded. The environment map and the target path may be generated by the management device 600 or the ECU 185. In the case of traveling on a road, the work vehicle 100 travels along the target path while sensing the surroundings thereof by use of the sensors such as the cameras 120 and the LiDAR sensor 140, with the implement 300 being raised. During travel, the controller 180 consecutively generates a local path and causes the work vehicle 100 to travel along the local path. This allows the work vehicle 100 to perform self-traveling while avoiding obstacles. During travel, the target path may be changed in accordance with the state.

There may be a case where while the work vehicle 100 is traveling outside the field, there is an obstacle such as a pedestrian or another vehicle on the global path or in the vicinity thereof. In order to avoid the work vehicle 100 colliding against the obstacle, while the work vehicle 100 is traveling, the ECU 185 of the controller 180 consecutively generates a local path along which the work vehicle 100 can avoid the obstacle. While the work vehicle 100 is traveling, the ECU 185 generates a local path based on sensing data acquired by the sensors included in the work vehicle 100 (the obstacle sensors 130, the LiDAR sensor 140, the cameras 120, etc.). The local path is defined by a plurality of waypoints along a portion of a second path 30B. Based on the sensing data, the ECU 185 determines whether or not there is an obstacle existing on the road on which the work vehicle 100 is proceeding or in the vicinity thereof. In the case where there is such an obstacle, the ECU 185 sets a plurality of waypoints such that the obstacle is avoided, and thus generates a local path. In the case where there is no such obstacle, the ECU 185 generates a local path substantially parallel to the second path 30B.

Information representing the generated local path is transmitted to the ECU 184 responsible for self-driving control. The ECU 184 controls the ECU 181 and the ECU 182 such that the work vehicle 100 travels along the local path. This allows the work vehicle 100 to travel while avoiding the obstacle. In the case where there is a traffic signal on the road on which the work vehicle 100 is traveling, the work vehicle 100 may recognize the traffic signal based on, for example, an image captured by the cameras 120 and perform an operation of halting at a red light and moving forward at a green light.

Figure 11:
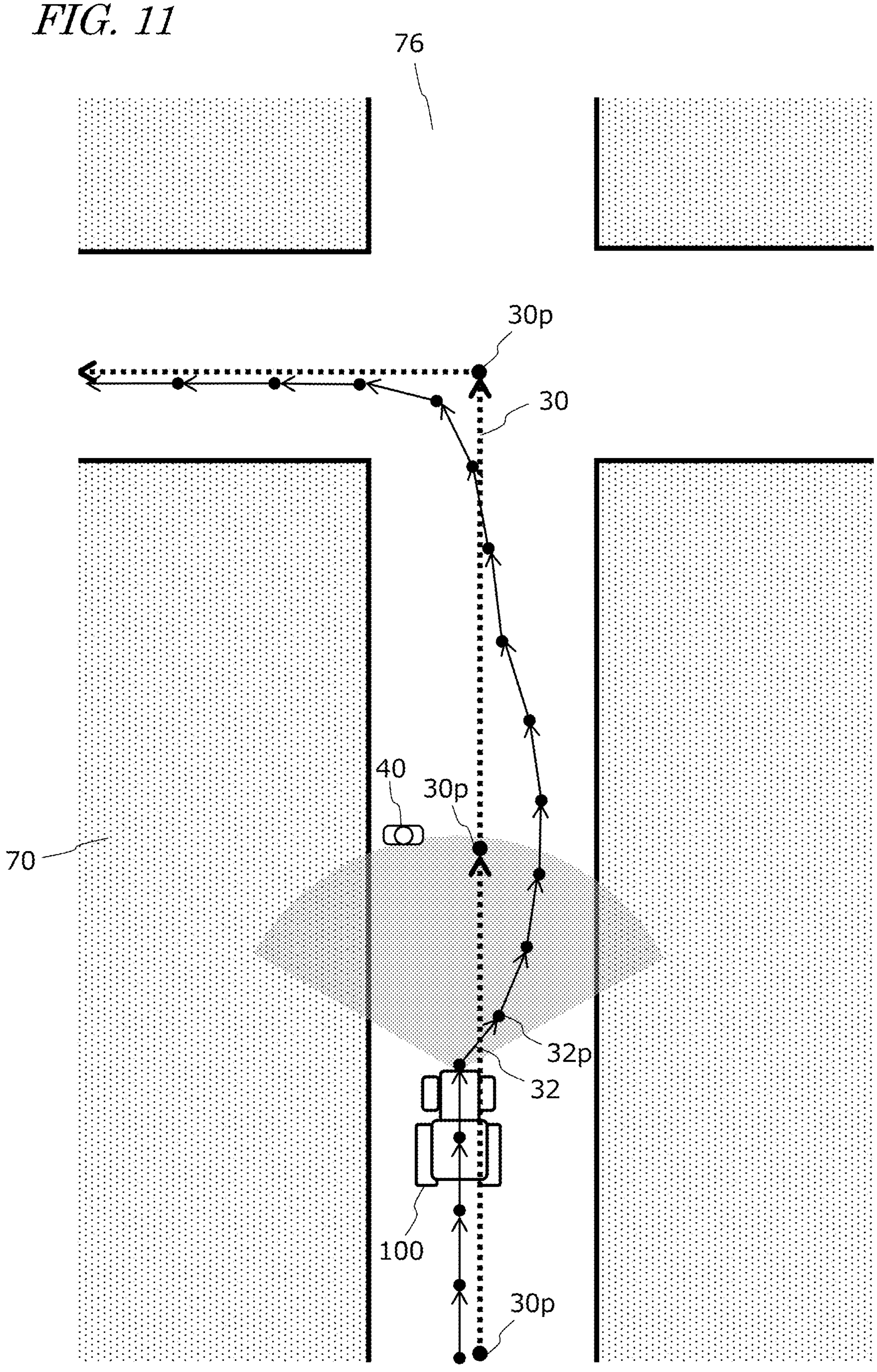
FIG. 11 is a diagram indicating an example of global path and an example of local path generated in an environment where there is an obstacle.

FIG. 11 is a diagram indicating an example of global path and an example of local path generated in an environment where there is an obstacle. FIG. 11 represents, as an example, a global path 30 by the broken line arrows, and represents, as an example, local paths 32 consecutively generated during travel of the work vehicle 100 by the solid line arrows. The global path 30 is defined by a plurality of waypoints 30_p_. The local paths 32 are defined by a plurality of waypoints 32_p_ set at a shorter interval than the waypoints 30_p_. The waypoints each have information on, for example, the position and the orientation. The management device 600 sets the plurality of waypoints 30_p_ at a plurality of points including an intersection of the roads 76 to generate the global path 30. The interval between the waypoints 30*p* is relatively long, and may be, for example, about several meters to about several tens of meters. The ECU 185 sets the plurality of waypoints 32*p* based on the sensing data output from the sensors during travel of the work vehicle 100 to generate the local paths 32. The interval between the waypoints 32*p* of the local paths 32 is shorter than the interval between the waypoints 30*p* of the global path 30. The interval between the waypoints 32*p* may be, for example, about several tens of centimeters (cm) to about several meters (m). The local paths 32 are generated in a relatively small range (e.g., a range of about several meters) from the position of the work vehicle 100. FIG. 11 shows, as an example, a series of local paths 32 generated while the work vehicle 100 travels along the road 76 between the fields 70 and turns left at the intersection. While the work vehicle 100 is moving, the ECU 185 repeats an operation of generating a local path from the position of the work vehicle 100 estimated by the ECU 184 to, for example, a point frontward of the work vehicle 100 by several meters. The work vehicle 100 travels along the local paths consecutively generated.

In the example shown in FIG. 11, there is an obstacle 40 (e.g., a human) frontward of the work vehicle 100. FIG. 11 shows a fan-shaped region as an example of range sensed by the sensors such as the cameras 120, the obstacle sensors 130 or the LiDAR sensor 140 mounted on the work vehicle 100. In such a state, the ECU 185 generates the local paths 32 such that the obstacle 40 detected based on the sensing data is avoided. The ECU 185 determines whether or not there is a possibility that the work vehicle 100 will collide against the obstacle 40, based on, for example, the sensing data and the width of the work vehicle 100 (including the width of the implement in the case where the implement is attached). In the case where there is a possibility that the work vehicle 100 will collide against the obstacle 40, the ECU 185 sets the plurality of waypoints 32*p* such that the obstacle 40 is avoided, and generates the local paths 32. Note that the ECU 185 may recognize the state of the road surface (e.g., being muddy, having a cave-in, etc.) based on the sensing data, in addition to the presence/absence of the obstacle 40, and in the case where a site on which it is difficult to travel is detected, may generate the local paths 32 such that such a site is avoided. The work vehicle 100 travels along the local paths 32. In the case where the obstacle 40 cannot be avoided in whichever manner the local paths 32 may be set, the controller 180 may halt the work vehicle 100. At this point, the controller 180 may transmit an alert signal to the terminal device 400 to warn a supervisor. In the case where after the work vehicle 100 halts, the obstacle 40 is moved and it is recognized that there is no risk of collision, the controller 180 may restart the travel of the work vehicle 100.

Figure 12:
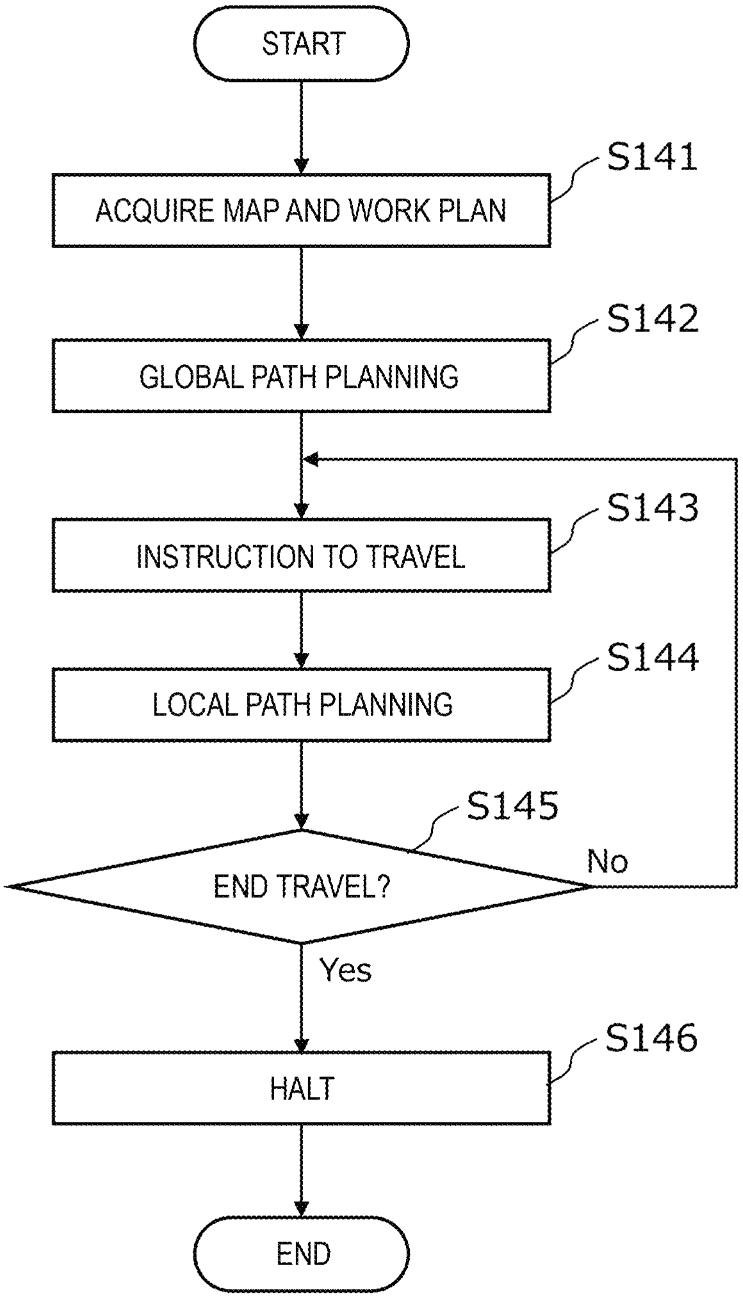
FIG. 12 is a flowchart indicating a method for path planning and travel control.

FIG. 12 is a flowchart indicating an operation of path planning and travel control according to the present example embodiment. Operation in steps S141 to S146 shown in FIG. 12 are executed, so that the path planning can be performed and the self-traveling of the work vehicle 100 can be controlled.

In the example shown in FIG. 12, the management device 600 first acquires a map and a work plan from the storage 650 (step S141). Next, the management device 600 performs global path planning for the work vehicle 100 based on the map and the work plan by the above-described method (step S142). The global path planning may be performed at any timing before the work vehicle 100 begins to travel. The global path planning may be performed immediately before the work vehicle 100 begins to travel, or the day before the work vehicle 100 begins to travel or even earlier. The global path may be generated based on information input by the user by use of the terminal device 400 (e.g., based on the departure point, the target point, the waypoints, etc.). As described above, when generating a path toward a field or a path from a field toward another site (e.g., the repository or the waiting area for the work vehicle 100), the management device 600 generates, as the path for the work vehicle 100, at least one of a path including an agricultural road with priority, a path including a road along a specific feature with priority, and a path including, with priority, a road where satellite signals are receivable in a normal manner, based on attribute information on each of the roads on the map. The management device 600 transmits the data representing the generated global path to the work vehicle 100. After this, the management device 600 gives the work vehicle 100 an instruction to travel, at a predetermined timing. Upon receipt of the instruction, the controller 180 of the work vehicle 100 controls the drive device 240 to begin the travel of the work vehicle 100 (step S143). This causes the work vehicle 100 to begin traveling. The timing when the work vehicle 100 begins traveling may set to, for example, such an appropriate timing as to allow the work vehicle 100 to arrive at the field before the time when the first task of agricultural work is to begin on each working day indicated by the work plan. During travel of the work vehicle 100, the ECU 185 of the controller 180 performs local path planning to avoid collision against an obstacle by the method described above (step S144). In the case where no obstacle is detected, the ECU 185 generates a local path substantially parallel to the global path. In the case where an obstacle is detected, the ECU 185 generates a local path along which the obstacle is avoidable. Next, the ECU 184 determines whether or not to end the travel of the work vehicle 100 (step S145). In the case where, for example, a local path along which the obstacle is avoidable cannot be generated, or in the case where the work vehicle 100 has arrived at the target point, the ECU 184 halts the work vehicle 100 (step S146). In the case where no obstacle is detected, or in the case where a local path along which the obstacle is avoidable is generated, the operation returns to step S143, and the ECU 184 causes the work vehicle 100 to travel along the generated local path. After this, the operation in steps S143 to S145 is repeated until it is determined in step S145 to end the travel.

The above-described operation allows the work vehicle 100 to automatically travel along the generated path without colliding against any obstacle.

In the example of FIG. 12, the global path, once generated, is not changed until the work vehicle 100 arrives at the target point. The global path is not limited to this, and may be modified while the work vehicle 100 is traveling. For example, the ECU 185 may recognize at least one of the state of the road on which the work vehicle 100 is traveling, the state of the plants in the surroundings of the work vehicle 100, and the state of weather, based on the sensing data acquired by the sensors such as the cameras 120 or the LiDAR sensor 140 while the work vehicle 100 is traveling, and in the case where the recognized state fulfills a predetermined condition, may change the global path. There is a case where while the work vehicle 100 is traveling along the global path, a portion of the road along the global path is difficult to pass along. For example, there is a case where the road is muddy due to a heavy rain, the road surface has a cave-in, or it is impossible to pass along the road due to an accident or any other reason. Alternatively, there is a case where a satellite signal from a GNSS satellite is difficult to be received for the reason that the plants around the agricultural road have grown more than expected or that a new building has been built. In consideration of such a situation, the ECU 185 may detect a road that is difficult to pass along, based on the sensing data acquired during travel of the work vehicle 100 and may change the path such that the post-change path avoids such a road. In the case where the path is changed, the ECU 185 may cause the storage 170 to store the post-change path and may transmit information on the post-change path to the management device 600. In this case, the next time a path to the same field is to be generated, the management device 600 may adopt the post-change path. This allows the path planning to be performed flexibly in accordance with a change in the environment.

The method by which the path for the work vehicle 100 is changed such that the work vehicle 100 avoids the detected obstacle is described above with reference to FIG. 11 and FIG. 12. Hereinafter, a method by which when detecting an object that is a possible obstacle, the work vehicle 100 determines whether or not to avoid the detected obstacle and thus controls travel thereof by self-driving will be described. The work vehicle 100 according to the present example embodiment, when detecting an object while performing the self-driving in a state where the implement 300 is linked thereto, determines whether or not to avoid the detected object based on a degree of influence of the object on the work vehicle 100 and a degree of influence of the object on the implement 300, and thus can control the travel thereof by self-driving. Herein, the work vehicle 100 is an agricultural machine such as a tractor or the like, and the implement 300 is a machine performing agricultural work.

The work vehicle 100 performing the self-driving according to the present example embodiment includes at least one sensor to sense the surrounding environment of the work vehicle 100 and outputting sensor data, the controller 180 controlling the self-driving of the work vehicle 100 based on the sensor data, and the linkage device 108 linking the implement to the work vehicle 100. While the work vehicle 100 is performing the self-driving in a state where the implement 300 is linked thereto, the controller 180 is configured or programmed to executes (i) to (iii) described below. (i) The controller 180 detects and classifies an object based on sensor data. (ii) The controller 180 determines a first influence degree indicating the magnitude of influence in the case where the detected and classified object contacts the work vehicle 100 and a second influence degree indicating the magnitude of influence in the case where the detected and classified object contacts the implement 300, in accordance with a result of classification of the object. (iii) In accordance with at least one of the first influence degree or the second influence degree, the controller 180 executes at least one of an operation of avoiding contact with the object or an operation of continuing the self-driving of the work vehicle 100 without executing the operation of avoiding contact with the object. Execution of at least one of the operation of avoiding contact with the object or the operation of continuing the self-driving of the work vehicle 100 without executing the operation of avoiding contact with the object may be referred to as "execution of an obstacle avoidance operation".

The work vehicle 100 according to the present example embodiment may be expressed as follows. The work vehicle 100 executes the obstacle avoidance operation based on the sensor data during self-traveling in the following manner: the work vehicle 100 controls the obstacle avoidance operation based on a result of the classification of the object detected by use of the sensor data and also based on the influence degrees in accordance with the result of the classification of the object, the influence degrees being in the case where the object contacts the work vehicle 100 or the implement 300 (i.e., based on the first influence degree and the second influence degree).

A plurality of the ECUs included in the controller 180 may cooperate with each other to perform a process of executing the obstacle avoidance operation. The controller 180 includes the ECU 181 to 186 described above and may also include another ECU performing a portion of, or an entirety of, the process of executing the obstacle avoidance operation.

Figure 13:
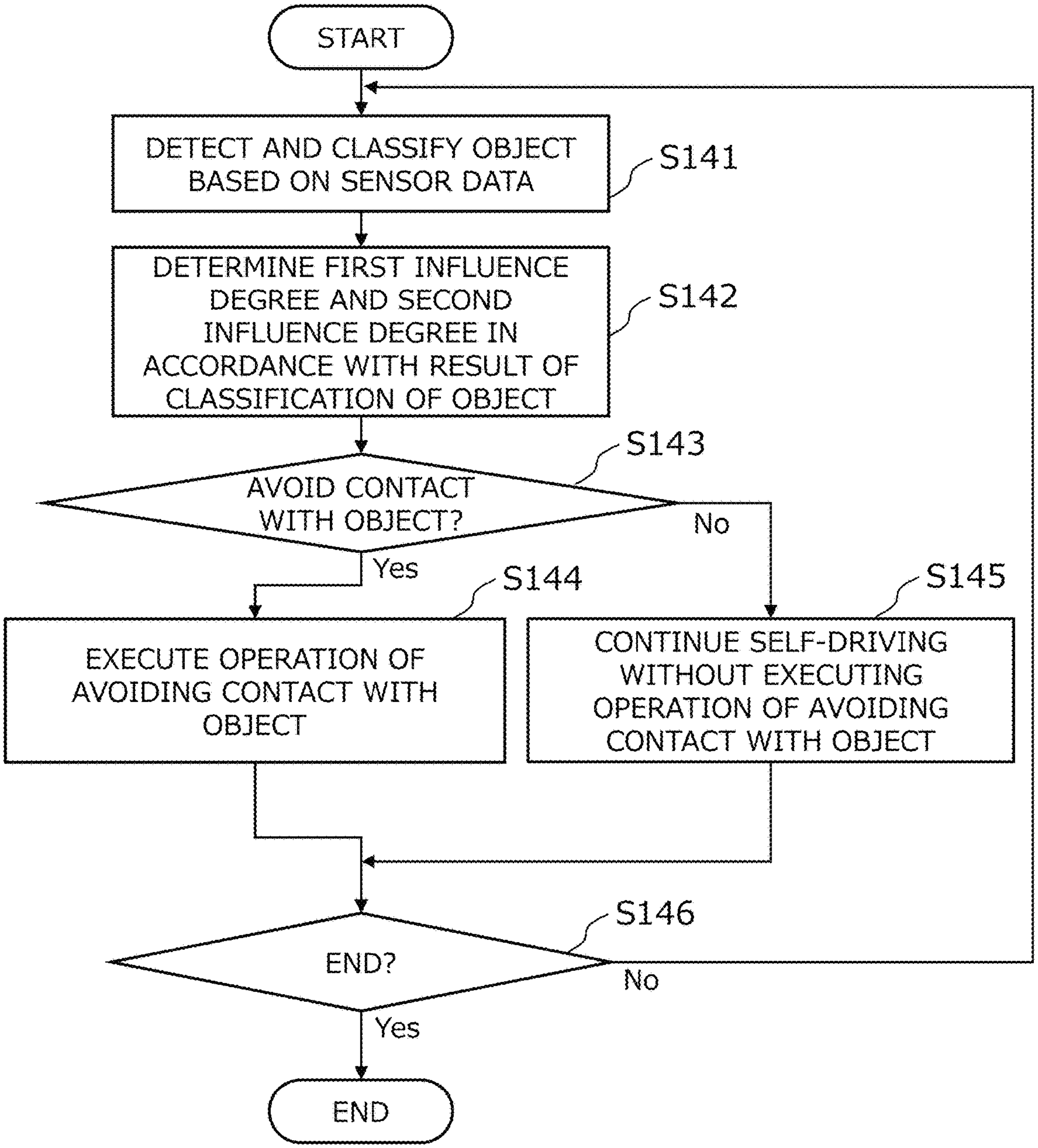
FIG. 13 is a flowchart indicating an example of procedure by which the work vehicle executes an obstacle avoidance operation.

With reference to FIG. 13, an example of procedure by which the work vehicle 100 executes the obstacle avoidance operation will be described. FIG. 13 is a flowchart indicating an example of procedure by which the work vehicle 100 executes the obstacle avoidance operation, and the procedure is executed while the work vehicle 100 is performing the self-driving with the implement 300 being linked thereto.

In step S141, the controller 180 detects and classifies an object based on sensor data.

Herein, sensor data is output from at least one sensor included in the work vehicle 100. The work vehicle 100 performs the self-driving while sensing the surrounding environment thereof by use of at least one sensor included in the work vehicle 100. In the example of FIG. 2, for instance, the sensors included in the work vehicle 100 include the plurality of cameras 120, the LiDAR sensor 140, and the plurality of obstacle sensors 130. The sensors are not limited to these. The work vehicle 100 may include at least one of the cameras 120, at least one of the obstacle sensors 130 or the LiDAR sensor 140. The controller 180 detects and classifies an object based on sensor data acquired by at least one of the sensors included in the work vehicle 100, for example, image data acquired by the cameras 120, data that is output from the obstacle sensors 130 or the LiDAR sensor 140 (e.g., point cloud data), or the like. The detection of the object may be performed continuously during the time period when the work vehicle 100 is performing the self-driving while sensing the surrounding environment thereof, or may be performed at a predetermined time interval previously set. The detection and the classification of the object may be performed based on sensor data acquired from the same sensor or sensor data acquired from different sensors. The detection and the classification of the object may be performed at the same time, or after an object is detected, the detected object may be classified (that is, the type of the detected object may be identified). The controller 180 classifies the detected object by identifying the type of the object based on, for example, the image data on the object acquired by the cameras 120. For example, the controller 180 classifies the object by use of a learned model constructed by deep learning of artificial intelligence. The learned model may be constructed as follows: image data on various objects is stored on a computer that executes learning by artificial intelligence, and the learned model is constructed by such a computer. Alternatively, the controller 180 may specify the object by pattern matching, obtain the class of the object from a database that shows such a class, and thus classify the object.

The object detected by the controller 180 based on the sensor data includes an object that is a possible obstacle (that is, an object that obstructs the travel of the work vehicle 100), and includes, for example, a moving object on the earth or a non-moving object that is present in a still state on the earth and also a portion of the ground surface in a specific state. Examples of the "part of the ground surface in a specific state" include recesses and protrusions (including hollows, cave-ins, holes, cracks in the road surface, etc.), muddy places, puddles, and the like that obstruct the travel.

Figure 14A:
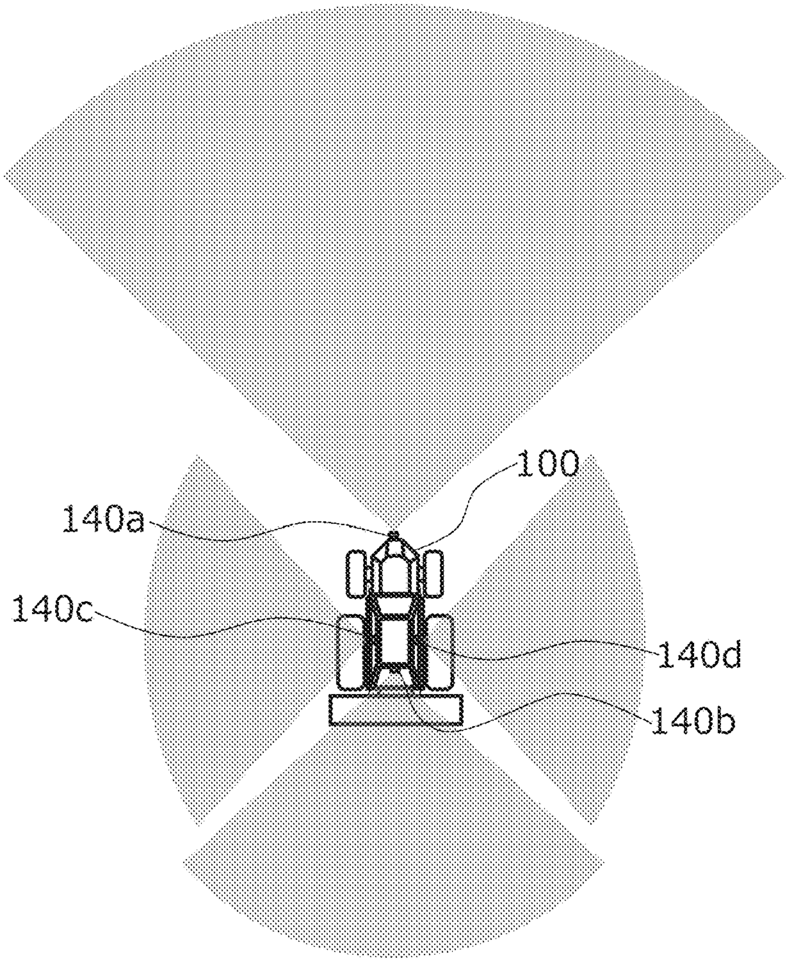
FIG. 14A is a diagram schematically indicating an example of zones where LiDAR sensors included in the work vehicle can sense.
Figure 14B:
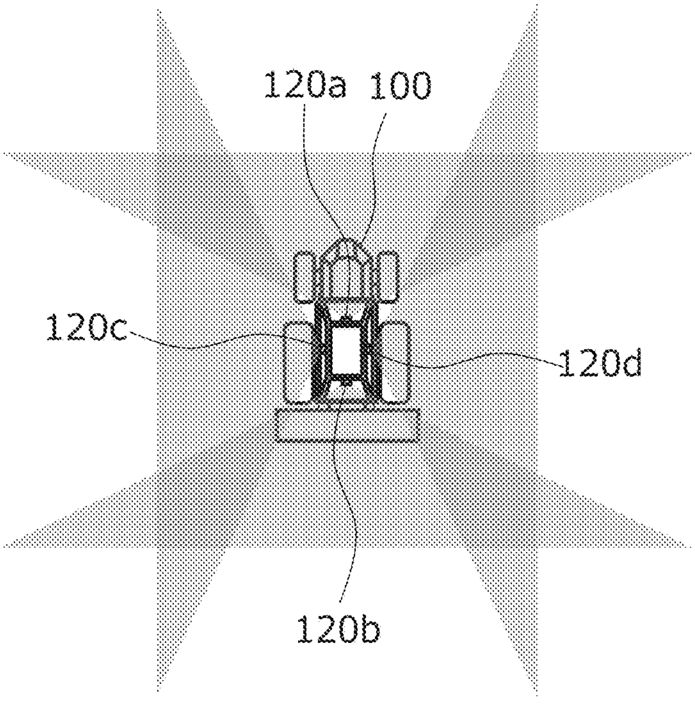
FIG. 14B is a diagram schematically indicating an example of zones where cameras included in the work vehicle can sense.

FIG. 14A and FIG. 14B are each a diagram schematically indicating an example of zones that can be sensed by the LiDAR sensors 140 or the cameras 120 included in the work vehicle 100. In each of the examples shown in FIG. 14A and FIG. 14B, the work vehicle 100 includes four LiDAR sensors 140 (140*a*, 140*b*, 140*c* and 140*d*) provided at the front, the rear, the left and the right of the work vehicle 100 or four cameras 120 (120*a*, 120*b*, 120*c* and 120*d*) provided at the front, the rear, the left and the right of the work vehicle 100, and can sense the surrounding environment thereof by these sensors. In FIG. 14A or FIG. 14B, an example of zones sensed by the LiDAR sensors 140 or the cameras 120 is represented by gray fan shapes or gray triangles.

The LiDAR sensors 140 each emit laser beam pulses (hereinafter, referred to simply as "laser pulses") one after another while changing the direction of emission, and can measure the distance to the position of each of points of reflection based on the difference between the time of emission and the time when reflected light of each laser pulse is acquired (ToF (Time of Flight) system). Alternatively, the LiDAR sensors 140 may each measure the distance using the FMCW (Frequency Modulated Continuous Wave) technology. A LiDAR sensor using the FMCW technology emits laser light having a frequency thereof modulated linearly, and can find the distance to the point of reflection and the speed, based on the frequency of the beat signal obtained by detection of interference light of the emitted light and the reflected light. The "point of reflection" may be a point on a surface of an object located in the surrounding environment of the work vehicle 100.

Each of the LiDAR sensors 140 may measure the distance from the LiDAR sensor 140 to the object by an arbitrary method. Measurement methods usable by the LiDAR sensors 140 are of, for example, a machine rotation system, a MEMS system, and a phased array system. These measurement methods are different from each other in the method of emitting the laser pulses (method of scanning). For example, a LiDAR sensor of the machine rotation system rotates a cylindrical head emitting laser pulses and detecting the reflected light of the laser pulses and scans the surrounding environment around a rotation axis thereof at 360 degrees. A LiDAR sensor of the MEMS system swings the direction of emission of laser pulses by use of a MEMS mirror and scans the surrounding environment within a range of a predetermined angle around a swinging axis thereof. A LiDAR sensor of the phased array system swings the direction of emission of light by controlling the optical phase and scans the surrounding environment within a range of a predetermined angle around a swinging axis thereof.

In step S142, the controller 180 determines, in accordance with the result of the classification of the object performed in step S142, the first influence degree indicating the magnitude of influence on the work vehicle 100 in the case where the detected and classified object contacts the work vehicle 100 and the second: influence degree indicating the magnitude of influence on the implement 300 in the case where the detected and classified object contacts the implement 300.

The first influence degree and the second influence degree may independently be represented by each of a plurality of stages (levels) indicating the magnitude of influence (e.g., three levels of small, medium and large), or by each of continuous numerical values. The controller 180 may calculate a value (score) of the first influence degree and a value (score) of the second influence degree by use of a predetermined evaluation expression (or a predetermined evaluation function). The controller 180 may refer to a table to determine the first influence degree and the second influence degree. For example, a table including a value (or a level) of each of the first influence degree and the second influence degree for each of classes (or levels) of the object may be stored in the storage 170 of the work vehicle 100, and the controller 180 may determine the first influence degree and the second influence degree based on the table and the result of the classification of the object.

FIG. 15 shows an example of table including the first influence degree and the second influence degree for each of the classes of the object. In the table in FIG. 15, the first influence degree and the second influence degree are each represented by the three stages of small, medium and large. The table stored in the storage 170 may include numerical values corresponding to the three stages of small, medium and large. The controller 180 may determine the first influence degree and the second influence degree based on the size of the object in addition to the table and the result of the classification of the object. For example, in the table shown in FIG. 15, different stages of the first influence degree are set for the puddle, the hollow, the hole and the stone in accordance with the sizes thereof. Even the same type of objects may have different magnitudes of influence in accordance with the size or the position thereof when such objects contact the work vehicle 100 or the implement 300.

For determining the first influence degree and the second influence degree, the controller 180 may determine whether or not the detected object will contact the work vehicle 100 and whether or not the detected object will contact the implement 300. A specific method for the determination will be described below with reference to FIG. 17A and FIG. 17B. A specific method for determining whether or not the detected object will contact the work vehicle 100 and whether or not the detected object will contact the implement 300 may be the method described in International Publication No. WO2022-038860. The entirety of the disclosure of International Publication No. WO2022-038860 is incorporated therein by reference.

In step S143, the controller 180 determines whether or not to execute the operation of avoiding contact with the object, in accordance with the first influence degree and/or the second influence degree.

The controller 180, for example, compares each of the first influence degree and the second influence degree against a predefined reference value to determine whether or not to execute the operation of avoiding contact with the object. For example, in the case where the first influence degree is smaller than a first reference value and the second influence degree is smaller than a second reference value, the controller 180 continues the self-driving of the work vehicle 100 without executing the operation of avoiding contact with the object. In the case where the first influence degree is equal to, or larger than, the first reference value or the second influence degree is equal to, or larger than, the second reference value, the controller 180 executes the operation of avoiding contact with the object. That, in the case where the first influence degree is smaller than the first reference value and the second influence degree is smaller than the second reference value, the controller 180 permits the work vehicle 100 to contact the object and causes the work vehicle 100 to continue the self-driving.

For example, in the case where the first influence degree and the second influence degree are each represented by one of three stages of small, medium and large as in the example of the table in FIG. 15, it is assumed that the first reference value and the second reference value are each "medium". In the case where both of the first influence degree and the second influence degree are "small", the controller 180 continues the self-driving of the work vehicle 100 without executing the operation of avoiding contact with the object. In the case where either one of the first influence degree and the second influence degree is "medium" or "large", the controller 180 executes the operation of avoiding contact with the object.

The first reference value and the second reference value may be predefined or set by the user. The first reference value and the second reference value may be the same as each other or different from each other. A range of magnitude of influence on the work vehicle 100 that is permitted in the case where the object contacts the work vehicle 100, and a range of magnitude of influence on the implement 300 that is permitted in the case where the object contacts the implement 300, may be different from each other.

Based on the determination made in step S143, the controller 180 executes the operation of avoiding contact with the object (step S144), or executes the operation of continuing the self-driving of the work vehicle 100 without executing the operation of avoiding contact with the object (step S145).

In the case where the procedure advances to step S144, that is, in the case where the controller 180 executes the operation of avoiding contact with the object, the controller 180 changes the target path for the work vehicle 100 such that the work vehicle 100 avoids contact with the object by, for example, the method described above with reference to FIG. 11 and FIG. 12. In the case where the detected object is a moving object (a human being, an animal, another vehicle, etc.), the controller 180 may cause the work vehicle 100 to halt for a predetermined time period and to sense the surrounding environment after an elapse of the predetermined time period. In the case where no object is detected based on the sensor data, the controller 180 may cause the work vehicle 100 to resume traveling. In the case where the object is still detected after the elapse of the predetermined time period, the controller 180 changes the target path for the work vehicle 100 such that the work vehicle 100 avoids the object by, for example, the method described above with reference to FIG. 11 and FIG. 12. In the case where the procedure advances to step S144 (that is, in the case where the controller 180 is to execute the operation of avoiding contact with the object), the controller 180 may cause the work vehicle 100 to halt traveling. When causing the work vehicle 100 to halt traveling, the controller 180 may send a signal to an external device.

In the case where the procedure advances to step S145, that is, in the case where the controller 180 executes the operation of continuing the self-driving of the work vehicle 100 without executing the operation of avoiding contact with the object, the controller 180 permits the work vehicle 100 to contact the object and causes the work vehicle 100 to continue the self-driving without changing the target path for the work vehicle 100. In this case, the controller 180 may change the speed of the work vehicle 100 when necessary (for example, may lower the speed of the work vehicle 100).

The controller 180 repeats the operation of steps S141 to S145 until a command to end the operation is issued (step S146).

The work vehicle 100 executes the obstacle avoidance operation by the above-described procedure.

The work vehicle described in International Publication No. WO2022-038860 is controlled regarding the self-traveling in accordance with the state of the road on which the work vehicle travels (including recesses and protrusions of the road and structures existing on the road) and the state of the implement linked to the work vehicle. In the case where a recess or protrusion of the road or a structure existing on the road is detected, the work vehicle described in International Publication No. WO2022-038860 determines whether or not the work vehicle is capable of traveling without contacting the recess or protrusion of the road or the structure on the road. In the case where it is determined that the work vehicle is not capable of traveling, the work vehicle halts driving.

By contrast, as described above, when an object that is a possible obstacle is detected, the work vehicle 100 according to the present example embodiment determines the magnitudes of influence in the case where the object contacts the work vehicle 100 and in the case where the object contacts the implement 300, as the first influence degree and the second influence degree. In the case where both of the first influence degree and the second influence degree are sufficiently small to be permitted, the work vehicle 100 is permitted to contact the object, and can continue the self-driving without changing the target path thereof. As compared with the work vehicle described in International Publication No. WO2022-038860, the work vehicle 100 can travel by self-driving more efficiently.

Figure 16:
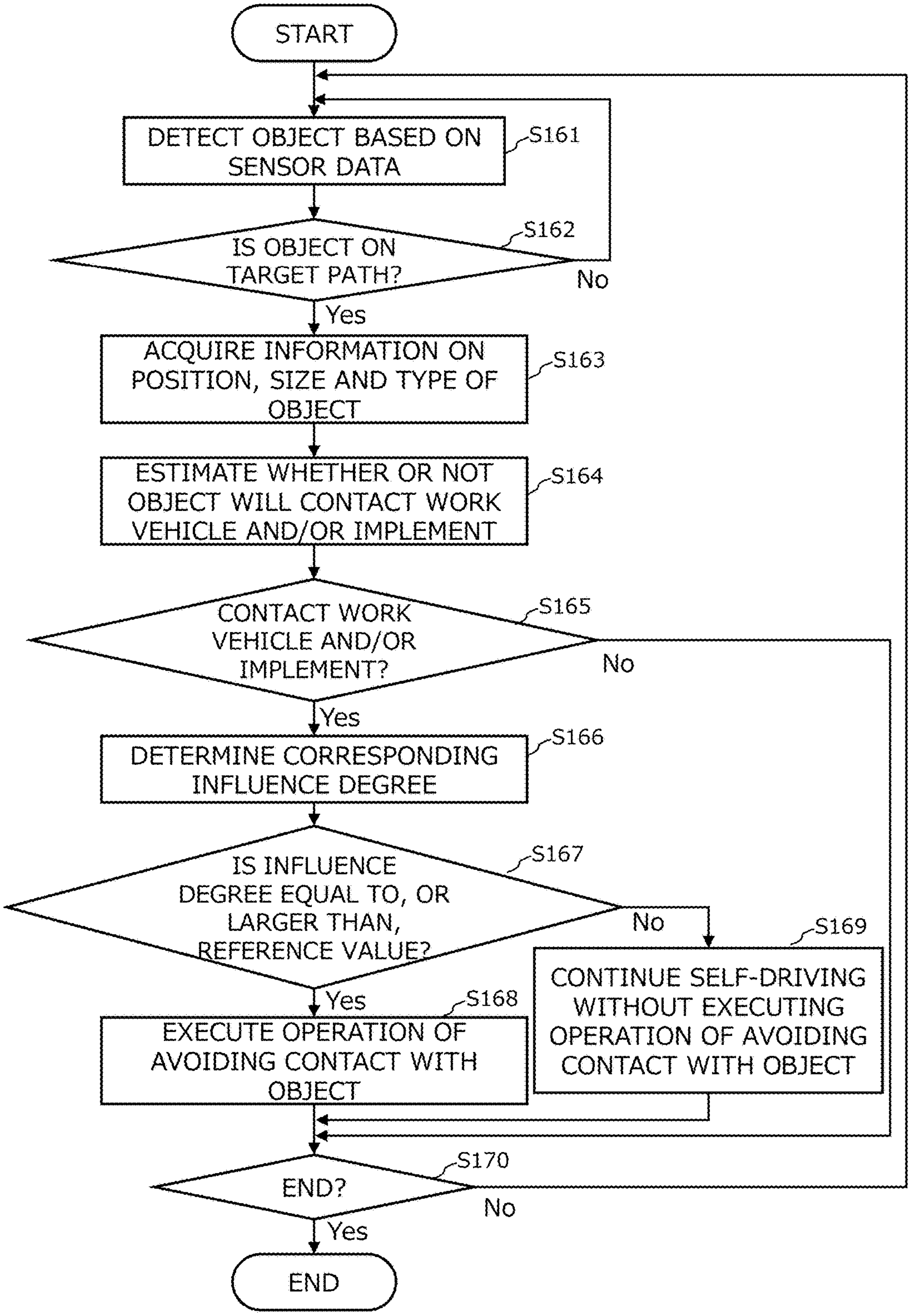
FIG. 16 is a flowchart indicating an example of procedure by which the work vehicle executes the obstacle avoidance operation.

With reference to FIG. 16, another example of procedure by which the work vehicle 100 executes the obstacle avoidance operation will be described. FIG. 16 is a flowchart indicating another example of procedure by which work vehicle 100 executes the obstacle avoidance operation. Steps common to, or corresponding to, those in the flowchart in FIG. 13 may not be described in detail.

In step S161, the controller 180 detects an object existing in the surrounding environment of the work vehicle 100 based on sensor data.

In step S162, the controller 180 determines whether or not the object detected in step S161 is present on, or in the vicinity of, the target path of the work vehicle 100. In the case where it is determined in step S162 that the detected object is present on, or in the vicinity of, the target path of the work vehicle 100, the procedure advances to step S163.

In step S163, the controller 180 acquires information on the position, the size and the type of the detected object.

In step S164, the controller 180 determines (estimates) whether or not the detected object will contact the work vehicle 100 and whether or not the detected object will contact the implement 300. The controller 180 determines whether or not the detected object will contact the work vehicle 100 and whether or not the detected object will contact the implement 300 based on, for example, the position of the detected object, the size of the work vehicle 100 and the size of the implement 300. A specific method for the determination will be described below with reference to FIGS. 17A and 17B.

In the case where the controller 180 determines in step S165 that the detected object will contact at least one of the work vehicle 100 or the implement 300, the procedure advances to step S166.

In step S166, the controller 180 determines at least one of the first influence degree or the second influence degree based on the result of the classification of the object.

In the case of, for example, determining in step S165 that the detected object will contact both of the work vehicle 100 and the implement 300, the controller 180 determines both of the first influence degree and the second influence degree based on the result of the classification of the object. Alternatively, in the case of determining in step S165 that the detected object will contact only one of the work vehicle 100 and the implement 300, the controller 180 determines only one of the first influence degree and the second influence degree that corresponds to the work vehicle 100 or the implement 300 that the object is determined to contact, based on the result of the classification of the object.

In step S167, the controller 180 compares the first influence degree and/or the second influence degree determined in step S166 against a predefined reference value (a first reference value and/or a second reference value) to determine whether or not to execute the operation of avoiding contact with the object.

In the case where, for example, both of the first influence degree and the second influence degree are determined in step S166, and in the case where the first influence degree is smaller than the first reference value and the second influence degree is smaller than the second reference value, the controller 180 continues the self-driving of the work vehicle 100 without executing the operation of avoiding contact with the object. In the case where the first influence degree is equal to, or larger than, the first reference value, or in the case where the second influence degree is equal to, or larger than, the second reference value, the controller 180 executes the operation of avoiding contact with the object. Alternatively, in the case where only one of the first influence degree and the second influence degree is determined in step S166, and in the case where the determined first influence degree or the determined second influence degree is smaller than the first reference value or the second reference value, the controller 180 continues the self-driving of the work vehicle 100 without executing the operation of avoiding contact with the object. In the case where the determined first influence degree or the determined second influence degree is equal to, or larger than, the first reference value or the second reference value, the controller 180 executes the operation of avoiding contact with the object.

Based on the determination made in step S167, the controller 180 executes the operation of avoiding contact with the object (step S168), or executes the operation of continuing the self-driving of the work vehicle 100 without executing the operation of avoiding contact with the object (step S169).

The controller 180 repeats the operation of steps S161 to S170 until a command to end the operation is issued (step S170).

The flowcharts described above as examples may be changed when necessary. For example, in the case where the detected object is a moving object (a human being, an animal, etc.), the controller 180 may estimate the moving speed of the object to determine whether or not the object will contact the work vehicle 100 or the implement 300.

Figure 17A:
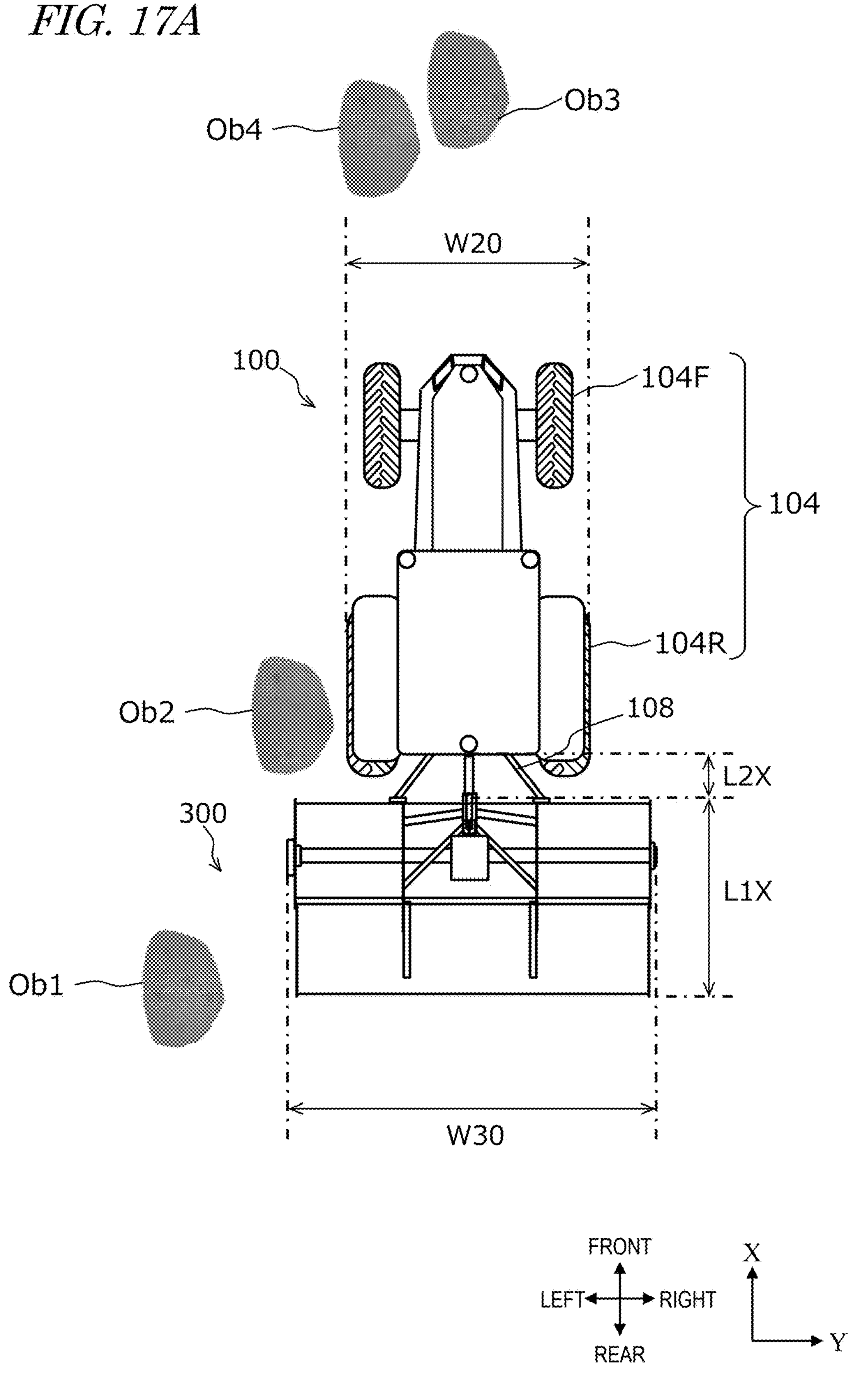
FIG. 17A is a schematic view indicating a method for determining whether or not a detected object will contact the work vehicle and the implement.
Figure 17B:
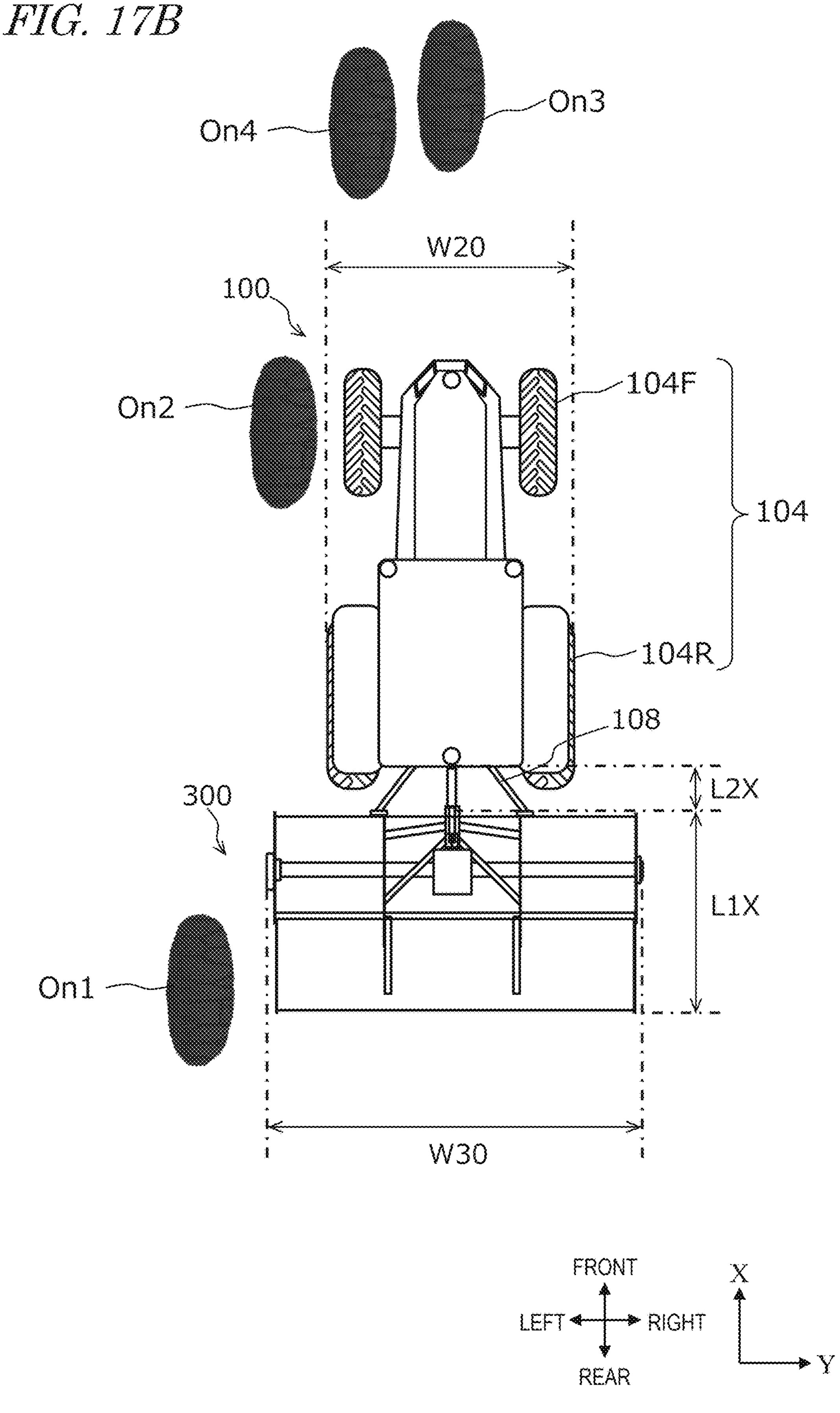
FIG. 17B is a schematic view indicating a method for determining whether or not the detected object will contact the work vehicle and the implement.

With reference to FIG. 17A and FIG. 17B, a method by which the controller 180 determines whether or not the detected object will contact the work vehicle 100 and whether or not the detected object will contact the implement 300 will be described. FIG. 17A and FIG. 17B are each a plan view schematically indicating the work vehicle 100 and the implement 300 linked to the work vehicle 100.

In the case where the detected object is an object existing on the earth (e.g., a stone, baggage, a crop, etc.), the controller 180 determines whether or not the detected object will contact the work vehicle 100 and whether or not the detected object will contact the implement 300 based on the position of the object (e.g., the position of the object in a direction of the width of the work vehicle 100 and the implement 300), a width W20 of the work vehicle 100 (vehicle body width), and a width W30 of the implement 300.

Objects Ob1 to Ob4 shown in FIG. 17A will be described as examples. The controller 180 determines an object, like the object Ob1, that is present outside the width W20 of the work vehicle 100 and the width W30 of the implement 300 will not contact the work vehicle 100 or the implement 300. The controller 180 determines that an object, like the object Ob2, that is present outside the width W20 of the work vehicle 100 will not contact the work vehicle 100. The object Ob2 is present inside the width W30 of the implement 300. In this case, the controller 180 determines whether or not the object Ob2 will contact the implement 300 further based on a height H22 (see FIG. 2) of the implement 300 from the ground surface and the height of the object Ob2. In the case where the height of the object Ob2 is sufficiently lower than the height H22 of the implement 300, the controller 180 determines that the object Ob2 will not contact the implement 300. The objects Ob3 and Ob4 are present within the width W20 of the work vehicle 100 and the width W30 of the implement 300. In this case, the controller 180 determines whether or not each of the objects Ob3 and Ob4 will contact the wheels 104 (the front wheel 104F and the rear wheel 104R) of the work vehicle 100. The object Ob3 is at such a position as not to interfere with the wheels 104 and has a height that is sufficiently lower than a height H12 (FIG. 2) of the work vehicle 100 from the ground surface and also sufficiently lower than the height H22 (FIG. 2) of the implement 300 from the ground surface. The controller 180 determines that the object Ob3 will not contact the work vehicle 100 or the implement 300. The object Ob4 is at such a position as to interfere with the wheels 104. The controller 180 determines that the object Ob4 will contact the work vehicle 100.

In the case where the detected object is a recess in the ground surface (e.g., a hole, a puddle, a waterway, etc.), the controller 180 determines whether or not the detected object will contact the work vehicle 100 and whether or not the detected object will contact the implement 300 based on the position of the recess (e.g., the position of the recess in the direction of the width of the work vehicle 100 and the implement 300), the width W20 of the work vehicle 100 (vehicle body width), and the width W30 of the implement 300. The controller 180 may determine whether or not the detected object will contact the work vehicle 100 and whether or not the detected object will contact the implement 300 based on the position of the recess and the positions of the wheels 104 of the work vehicle 100.

Recesses On1 to On4 shown in FIG. 17B will be described as examples. The controller 180 determines the recess On1, which is present outside the width W20 of the work vehicle 100 and the width W30 of the implement 300, will not contact the work vehicle 100 or the implement 300. The controller 180 determines the recess On2, which is present outside the width W20 of the work vehicle 100 but inside the width W30 of the implement 300, will not contact the work vehicle 100 or the implement 300. The recesses On3 and On4 are present within the width W20 of the work vehicle 100 and the width W30 of the implement 300. In this case, the controller 180 determines whether or not each of the recesses On3 and On4 will contact the wheels 104 (the front wheel 104F and the rear wheel 104R) of the work vehicle 100. The recess On3 is at such a position as not to interfere with the wheels 104. The controller 180 determines that the recess On3 will not contact the work vehicle 100 or the implement 300. The object Ob4 is at such a position as to interfere with the wheels 104. In this case, the controller 180 determines whether or not the recess On4 will contact the work vehicle 100 or the implement 300 based on the width or the depth of the recess On4, the size of the wheels 104, the height H22 of the implement 300 from the ground surface, the height H12 of the work vehicle 100 from the ground surface, and the like. In the case where each of the recesses On1 to On4 does not contact the wheels 104 (the front wheel 104F and the rear wheel 104R) of the work vehicle 100, the controller 180 may determine that the each of the recesses On1 to On4 will not contact the work vehicle 100.

For determining whether or not the detected object will contact the work vehicle 100 and whether or not the detected object will contact the implement 300, the controller 180 may further acquire and use, for example, information on a length L1X of the implement 300, a length L2X of the linking device 108 in a front-rear direction, and a length of offset of the implement 300 in a left-right direction. In the example of FIGS. 17A and 17B, the length of offset of the implement 300 in the left-right direction is zero. The offset length of the implement 300 in the left-right direction is not limited to this.

In the example described herein, the controller 180 controls the self-driving of the work vehicle 100 based on the sensor data output from at least one sensor included in the work vehicle 100. Note that the work vehicle 100 may perform the self-driving while sensing the surrounding environment thereof by use of at least one sensor included in another movable body such as, for example, an agricultural machine different from the work vehicle 100, a drone (Unmanned Arial Vehicle; UAV) or the like. The controller 108 may control the self-driving of the work vehicle 100 by use of sensor data acquired by a sensor included in another movable body such as, for example, an agricultural machine different from the work vehicle 100, a drone or the like.

A portion of, or an entirety of, the process to be executed by the controller 180 of the work vehicle 100 according to the present example embodiment may be executed by another device. Such another device functions as a controller of the control system according to the present example embodiment, and may be, for example, any of the management device 600 (processor 660), the terminal device 400 (processor 460), and the operational terminal 200. For example, in the case where a portion of the process to be executed by the controller 180 is executed by the processor 660 of the management device 600, a combination of the controller 180 and the management device 600 functions as the controller of the control system.

A control system according to the present example embodiment is a control system for a work vehicle performing self-driving. The control system includes at least one sensor to sense a surrounding environment of the work vehicle 100 and output sensor data, and a controller configured or programmed to control the self-driving of the work vehicle 100 based on the sensor data. When the work vehicle 100 is performing the self-driving in a state where the implement 300 is linked thereto, the controller is configured or programmed to execute (i) to (iii) described below. (i) The controller detects and classifies an object based on the sensor data. (ii) The controller determines a first influence degree indicating a magnitude of influence in the case where the detected and classified object contacts the work vehicle 100 and a second influence degree indicating a magnitude of influence in the case where the detected and classified object contacts the implement 300, in accordance with a result of the classification of the object. (iii) The controller executes, in accordance with at least one of the first influence degree or the second influence degree, at least one of an operation of avoiding contact with the object or an operation of continuing the self-driving of the work vehicle 100 without executing the operation of avoiding contact with the object.

A control method according to the present example embodiment is a control method for the work vehicle 100 performing self-driving. The control method includes (i) detecting and classifying an object based on sensor data output from at least one sensor included in the work vehicle 100, (ii) determining a first influence degree indicating a magnitude of influence in the case where the detected and classified object contacts the work vehicle 100 and a second influence degree indicating a magnitude of influence in the case where the detected and classified object contacts the implement 300 linked to the work vehicle 100, in accordance with a result of the classification of the object, and (iii) executing, in accordance with at least one of the first influence degree or the second influence degree, at least one of an operation of avoiding contact with the object or an operation of continuing the self-driving of the work vehicle 100 without executing the operation of avoiding contact with the object.

The example embodiments and techniques according to the present disclosure are applicable to work vehicles such as, for example, tractors, harvesters, rice transplanters, vehicles for crop management, vegetable transplanters, mowers, seeders, spreaders, or agricultural robots, methods for controlling travel of work vehicles by self-driving, and control systems for work vehicles performing self-driving.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle to perform self-driving, the work vehicle comprising:

at least one sensor to sense a surrounding environment of the work vehicle and output sensor data;

a controller configured or programmed to control the self-driving of the work vehicle based on the sensor data; and a link to attach an implement to the work vehicle; wherein when performing the self-driving of the work vehicle in a state where the implement is linked to the work vehicle, the controller is configured or programmed to:

detect and classify an object based on the sensor data;

determine a first influence degree indicating a magnitude of influence when the object contacts the work vehicle and a second influence degree indicating a magnitude of influence when the object contacts the implement, in accordance with a result of the classification of the object; and execute, in accordance with at least one of the first influence degree or the second influence degree, at least one of an operation of avoiding contact with the object or an operation of continuing the self-driving without executing the operation of avoiding.

2. The work vehicle of claim 1, wherein when the first influence degree is smaller than a first reference value and the second influence degree is smaller than a second reference value, the controller is configured or programmed to continue the self-driving of the work vehicle without executing the operation of avoiding; and when the first influence degree is equal to, or larger than, the first reference value or the second influence degree is equal to, or larger than, the second reference value, the controller is configured or programmed to execute the operation of avoiding contact with the object.

3. The work vehicle of claim 1, wherein the controller is configured or programmed to determine whether or not the object will contact the work vehicle and whether or not the object will contact the implement, based on a position of the detected object, a size of the work vehicle, and a size of the implement; and when determining that the object will contact at least one of the work vehicle or the implement, the controller is configured or programmed to execute at least one of the operation of avoiding contact with the object or the operation of continuing the self-driving without executing the operation of avoiding, based on at least one of the first influence degree or the second influence degree.

4. The work vehicle of claim 3, wherein when determining that the object will contact at least one of the work vehicle or the implement, the controller is configured or programmed to determine at least one of the first influence degree or the second influence degree based on the result of the classification of the object.

5. The work vehicle of claim 4, wherein when determining that the object will contact both of the work vehicle and the implement, the controller is configured or programmed to determine both of the first influence degree and the second influence degree based on the result of the classification of the object.

6. The work vehicle of claim 4, wherein when determining that the object will contact either one of the work vehicle and the implement, the controller is configured or programmed to determine either one of the first influence degree and the second influence degree corresponding to the work vehicle or the implement that the object is determined to contact, based on the result of the classification of the object.

7. The work vehicle of claim 1, further comprising a storage to store a table including a value of each of the first influence degree and the second influence degree for each of classes of the object; wherein the controller is configured or programmed to determine the first influence degree and the second influence degree based on the table and the result of the classification of the object.

8. The work vehicle of claim 1, wherein:

the work vehicle is an agricultural machine; and the implement is a machine to perform agricultural work.

9. A control method for a work vehicle performing self-driving, the control method comprising:

detecting and classifying an object based on sensor data output from at least one sensor included in the work vehicle;

determining a first influence degree indicating a magnitude of influence when the object contacts the work vehicle and a second influence degree indicating a magnitude of influence when the object contacts an implement linked to the work vehicle, in accordance with a result of the classification of the object; and executing, in accordance with at least one of the first influence degree or the second influence degree, at least one of an operation of avoiding contact with the object or an operation of continuing the self-driving without executing the operation of avoiding.

10. A work vehicle configured or programmed to execute an obstacle avoidance operation based on sensor data during self-traveling and to control the obstacle avoidance operation based on a result of classification of an object detected based on the sensor data and based on an influence degree when the object contacts each of the work vehicle and an implement linked to the work vehicle, the influence degree being in accordance with the result of the classification of the object.

11. A control system for a work vehicle to perform self-driving, the control system comprising:

at least one sensor to sense a surrounding environment of the work vehicle and output sensor data; and a controller configured or programmed to control the self-driving of the work vehicle based on the sensor data; wherein when the work vehicle is performing the self-driving in a state where an implement is linked thereto, the controller is configured or programmed to:

detect and classify an object based on the sensor data;

determine a first influence degree indicating a magnitude of influence when the object contacts the work vehicle and a second influence degree indicating a magnitude of influence when the object contacts the implement, in accordance with a result of the classification of the object; and execute, in accordance with at least one of the first influence degree or the second influence degree, at least one of an operation of avoiding contact with the object or an operation of continuing the self-driving without executing the operation of avoiding.

* * * * *